United States Patent
Kariya

(10) Patent No.: US 9,692,636 B2
(45) Date of Patent: Jun. 27, 2017

(54) RELAY SYSTEM AND RELAY DEVICE

(71) Applicant: Hitachi Metals, Ltd., Minato-ku, Tokyo (JP)

(72) Inventor: Kazutoshi Kariya, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 66 days.

(21) Appl. No.: 14/823,183

(22) Filed: Aug. 11, 2015

(65) Prior Publication Data
US 2016/0056995 A1    Feb. 25, 2016

(30) Foreign Application Priority Data

Aug. 22, 2014   (JP) ................................. 2014-169854

(51) Int. Cl.
| | |
|---|---|
| *G01R 31/08* | (2006.01) |
| *H04L 12/24* | (2006.01) |
| *H04B 3/36* | (2006.01) |
| *H04L 29/14* | (2006.01) |

(52) U.S. Cl.
CPC ........... *H04L 41/0654* (2013.01); *H04B 3/36* (2013.01); *H04L 41/0631* (2013.01); *H04L 69/40* (2013.01)

(58) Field of Classification Search
None
See application file for complete search history.

(56) References Cited

U.S. PATENT DOCUMENTS

| | | | | |
|---|---|---|---|---|
| 6,657,952 B1* | 12/2003 | Shiragaki | ............ | H04J 14/0212 370/223 |
| 6,661,800 B1* | 12/2003 | Hayama | .................. | H04L 12/42 370/249 |
| 7,050,399 B2* | 5/2006 | Masuda | ..................... | H04J 3/14 370/245 |
| 7,242,860 B2* | 7/2007 | Ikeda | .................. | H04J 14/0283 370/216 |
| 7,529,182 B2* | 5/2009 | Homma | .................. | H04J 3/085 370/224 |
| 2013/0121164 A1* | 5/2013 | Shabtay | .............. | H04L 12/4641 370/241.1 |
| 2014/0355981 A1* | 12/2014 | Miyazaki | .............. | H04J 14/021 398/38 |
| 2015/0207668 A1* | 7/2015 | Civil | .................... | H04L 41/0654 370/223 |

FOREIGN PATENT DOCUMENTS

| | | |
|---|---|---|
| JP | 2013-192034 A | 9/2013 |
| JP | 2013-239909 A | 11/2013 |

\* cited by examiner

*Primary Examiner* — Phirin Sam
(74) *Attorney, Agent, or Firm* — Crowell & Moring LLP

(57) ABSTRACT

A relay device includes: a first port and a second port which are connected to a ring network; a relay path for relaying a frame between the first port and the second port; and a first monitoring point and a second monitoring point provided on a side close to the second port on the relay path. The first monitoring point monitors continuity between the first monitoring point and the second monitoring point of a different device via the relay path of its own device by using a CCM frame based on Ethernet OAM. The second monitoring point monitors continuity between itself and the first monitoring point of a different device via the relay path of the different device by using the CCM frame.

10 Claims, 16 Drawing Sheets

RELAY SYSTEM AND RELAY DEVICE

CROSS-REFERENCE TO RELATED APPLICATION

The present application claims priority from Japanese Patent Application No. 2014-169854 filed on Aug. 22, 2014, the content of which is hereby incorporated by reference into this application.

TECHNICAL FIELD OF THE INVENTION

The present invention relates to a relay system and a relay device, for example, a relay system and a relay device which use a ring protocol specified by ITU-T (International Telecommunication Union Telecommunication Standardization Sector) G.8032.

BACKGROUND OF THE INVENTION

For example, Japanese Patent Application Laid-Open Publication No. 2013-192034 (Patent Document 1) discloses a technique of switching one of two RPL (Ring Protection Link) ports set to a closed state with a closed section interposed therebetween from the closed state to an open state for a predetermined period. Although failure detection of bit dependence is likely to be difficult in a CCM (Continuity Check Message) frame, this failure detection is made possible by causing a frame containing a checksum to flow for a predetermined period from one RPL port to the other RPL port.

Also, Japanese Patent Application Laid-Open Publication No. 2013-239909 (Patent Document 2) discloses a technique for enhancing fault tolerance in the case where multi-chassis link aggregation and ERP (Ethernet Ring Protection) are applied at the same time. Each of L2 switches constituting the ERP monitors a link fault between itself and a neighboring L2 switch by transmitting and receiving an ERP neighbor monitoring frame based on a CC (Continuity Check) function of Ethernet (registered trademark) OAM (Operation Administration and Maintenance) to and from the neighboring L2 switch.

SUMMARY OF THE INVENTION

For example, as one of ring protocols, the ring protocol specified by ITU-T G.8032 has been known. This ring protocol is referred to as ERP in some cases. In this ring protocol, as described in Patent Document 1 and Patent Document 2, presence or absence of fault in a link between neighboring switches is determined by transmitting and receiving a CCM frame based on a CC function of Ethernet OAM between the neighboring switches on a ring network. When the determination result is presence of fault, path switching based on the ring protocol is performed.

However, fault does not always occur in the link between the neighboring switches, and may occur also inside a switch. In this case, each switch adjacent to the switch having a fault sometimes cannot recognize the presence of the fault. More specifically, such a situation that the CC function of Ethernet OAM operates normally though a fault which causes disconnection of the ring network has occurred in the switch having a fault may arise. Thus, the path switching based on the ring protocol is not performed, and there is a possibility of causing the frame loss and others.

The present invention has been made in view of such a circumstance, and one object thereof is to realize appropriate path switching in accordance with an internal fault of a relay device in a relay system and a relay device using, for example, the ring protocol specified by ITU-T G.8032.

The above and other objects and novel characteristics of the present invention will be apparent from the description of the present specification and the accompanying drawings.

The following is a brief description of an outline of the typical invention disclosed in the present application.

A relay system according to one embodiment is provided with a plurality of relay devices constituting a ring network. Each of the plurality of relay devices includes: a first port and a second port which are connected to the ring network; a relay path for relaying a frame between the first port and the second port; a first monitoring point and a second monitoring point provided on a side close to the second port on the relay path; and a ring control unit which controls the ring network. The first monitoring point monitors continuity between itself and the second monitoring point of a different device via the relay path of its own device by using a CCM frame based on Ethernet OAM. The second monitoring point monitors continuity between itself and the first monitoring point of a different device via the relay path of the different device by using the CCM frame.

The effects obtained by typical embodiments of the invention disclosed in the present application will be briefly described below. That is, it is possible to realize appropriate path switching in accordance with an internal fault of a relay device in a relay system and a relay device using, for example, the ring protocol specified by ITU-T G.8032.

BRIEF DESCRIPTIONS OF THE DRAWINGS

DESCRIPTIONS OF THE PREFERRED EMBODIMENTS

Figure 1:
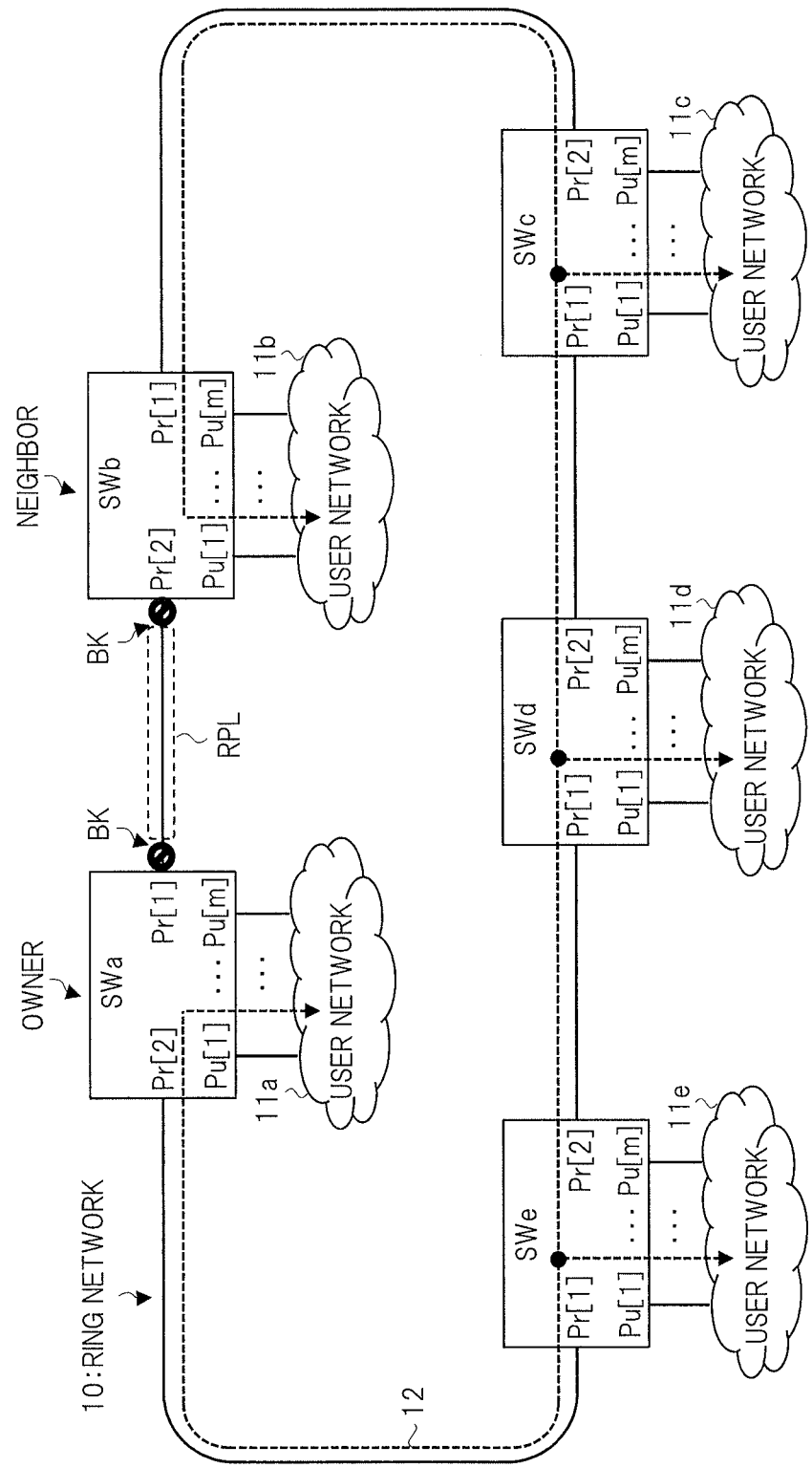
FIG. 1 is a schematic diagram illustrating a configuration example to be a premise of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

<<General Configuration and General Operation of Relay System (Premise)>>

FIG. 1 is a schematic diagram illustrating a configuration example to be a premise of a relay system according to the first embodiment of the present invention. The relay system illustrated in FIG. 1 includes a plurality of (here, 5) switching devices (relay devices) SWa to SWe constituting a ring network 10. Each of the switching devices SWa to SWe has two ring ports (first and second ports) Pr[1] and Pr[2] and m (m is an integer or 1 or more) user ports Pu[1] to Pu[m]. Although the number of switching devices constituting the ring network 10 is assumed to be 5 in this example, the number is not limited to this, and may be 2 or more.

The ring network 10 is controlled based on, for example, a ring protocol specified by ITU-T G 8032. In other words, each of the switching devices SWa to SWe is provided with various control functions based on the ring protocol. Each of the switching devices SWa to SWe is a L2 switch which performs relay process of a layer 2 (L2) of an OSI reference model or may be a L3 switch which performs relay process of a layer 3 (L3). However, since the relay process on the ring network 10 is performed based on the L2, the case where each of the switching devices SWa to SWe is the L2 switch is taken as an example here.

The two ring ports Pr[1] and Pr[2] are each connected to the ring network 10. In other words, each of the switching devices SWa to SWe is connected via the ring ports Pr[1] and Pr[2] in a ring shape, so that the ring network 10 is formed. In the example of FIG. 1, the ring ports (first ports) Pr[1] of the switching devices SWa, SWb, SWc, SWd and SWe are connected to the ring ports (second ports) Pr[2] of the neighboring switching devices SWb, SWc, SWd, SWe and SWa via a communication line, respectively.

The user ports Pu[1] to Pu[m] are connected to predetermined user networks. In the example of FIG. 1, the user ports Pu[1] to Pu[m] of the switching devices SWa to SWe are connected to user networks 11a to 11e, respectively. In each of the user networks 11a to 11e, switching devices, various information processing devices (server device, terminal device and others) and others are arranged appropriately.

Here, based on ITU-T G.8032, the switching device SWa is set as an owner node, and the switching device SWb is set as a neighbor node. A link between the owner node and the neighbor node is referred to as RPL (Ring Protection Link). When there is no fault on the ring network 10, the switching device SWa sets the ring port Pr[1] located at one end of the RPL to a block state BK, and the switching device SWb sets the ring port Pr[2] located at the other end of RPL to the block state BK. The port controlled to the block state BK blocks frames from passing through it.

When there is no fault on the ring network 10, this RPL prevents the looping of a communication path on the ring network 10. More specifically, as illustrated in FIG. 1, a communication path 12 via the switching devices SWe, SWd and SWc is formed between the switching device SWa and the switching devices SWb. Frame transfer between the user networks 11a to 11e is performed on this communication path 12.

<<Problem of Relay System (Premise)>>

Figure 15:
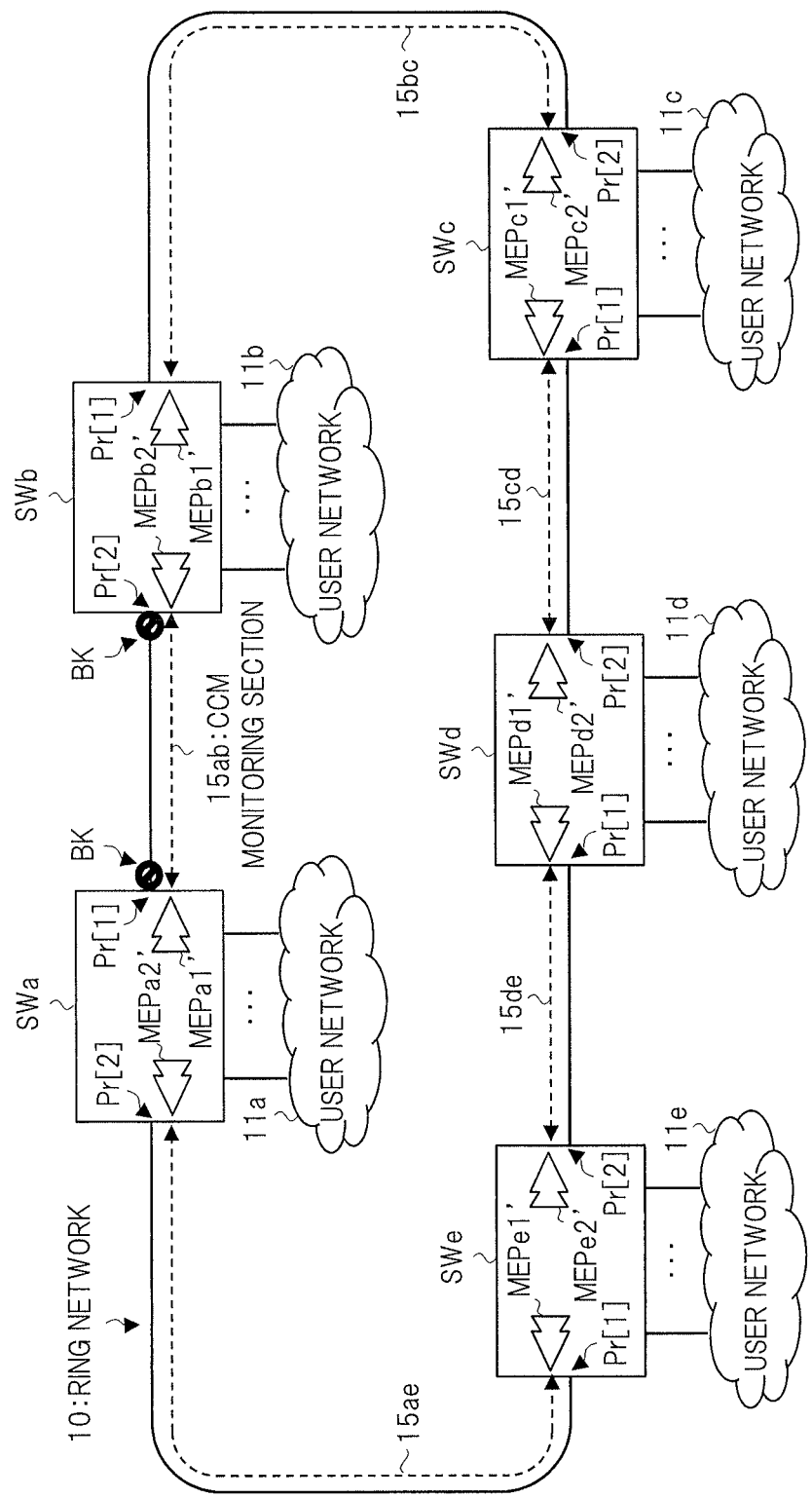
FIG. 15 is a schematic diagram illustrating an example of a fault monitoring method to be a comparative example of the embodiment in the relay system of FIG. 1.

FIG. 15 is a schematic diagram illustrating an example of a fault monitoring method to be a comparative example of the embodiment in the relay system of FIG. 1. As illustrated in FIG. 15, the switching devices SWa to SWe are provided with monitoring points MEPa1' to MEPe1' corresponding to the ring ports (first ports) Pr[1] respectively, and are provided with monitoring points MEPa2' to MEPe2' corresponding to the ring ports (second ports) Pr[2] respectively.

Here, ITU-T G.8032 specifies that a CC (Continuity check) function of Ethernet OAM is used for monitoring presence or absence of fault in a link between the switching devices. Ethernet OAM has been standardized by "ITU-T Y.1731" and "IEEE802.1ag", etc. as a standard for monitoring the continuity between devices. In the CC function, a monitoring section is set by monitoring points referred to as MEP (Maintenance End Point) as illustrated in FIG. 15.

MEPs at both ends of each monitoring section monitor the continuity of each monitoring section by transmitting and receiving a CCM (Continuity Check Message) frame which is a continuity monitoring frame at regular intervals.

In the example of FIG. 15, the monitoring point MEPa1' of the switching device SWa sets a CCM monitoring section 15ab between itself and the monitoring point MEPb2' of a different device (SWb), thereby monitoring the continuity between the first port Pr[1] of its own device and the second port Pr[2] of the different device (SWb) connected thereto. Meanwhile, the monitoring point MEPb2' of the switching device SWb also sets the CCM monitoring section 15ab between itself and the monitoring point MEPa1' of a different device (SWa), thereby monitoring the continuity between the second port Pr[2] of its own device and the first port Pr[1] of the different device (SWa) connected thereto.

Similarly, the CCM monitoring sections are sequentially set on the ring network 10. More specifically, a CCM monitoring section 15bc is set between the first port Pr[1] (MEPb1') of the switching device SWb and the second port Pr[2] (MEPc2') of the switching device SWc. A CCM monitoring section 15cd is set between the first port Pr[1] (MEPc1') of the switching device SWc and the second port Pr[2] (MEPd2') of the switching device SWd. A CCM monitoring section 15de is set between the first port Pr[1] (MEPd1') of the switching device SWd and the second port Pr[2] (MEPe2') of the switching device SWe. Then, a CCM monitoring section 15ae is set between the first port Pr[1] (MEPe1') of the switching device SWe and the second port Pr[2] (MEPa2') of the switching device SWa.

In each CCM monitoring section (for example, 15ab), the monitoring point of one end (MEPa1') recognizes the continuity with respect to the monitoring point of the other end (MEPb2') as a LOC (Loss Of Continuity) state when it does not receive a CCM frame from the monitoring point of the other end (MEPb2') within a predetermined period. This predetermined period is, for example, 3.5 times as long as a transmission interval (typically 3.3 ms) of the CCM frame. In this case, the monitoring point of one end (MEPa1') transmits the CCM frame having a flag attached to a RDI (Remote Defect Indication) bit when transmitting the CCM frame to the monitoring point of the other end (MEPb2').

The monitoring point of the other end (MEPb2') recognizes the continuity with respect to the monitoring point of one end (MEPa1') as a RDI state by receiving the CCM frame having a flag attached to the RDI bit from the monitoring point of one end (MEPa1'). More specifically, the LOC state with respect to a predetermined monitoring point means that a reception path from the predetermined monitoring point does not have the continuity, and the RDI state with respect to a predetermined monitoring point means that a transmission path to the predetermined monitoring point does not have the continuity. Note that, in the present specification, a CCM frame having a flag attached to a RDI bit is referred to as a RDI frame, a CCM frame having no flag attached to a RDI bit is referred to as a CC frame, and the RDI frame and CC frame are collectively referred to as a CCM frame.

Each of the switching devices SWa to SWe determines presence or absence of fault in the link connected to the ring ports Pr[1] and Pr[2] of its own device based on presence or absence of recognition of a LOC state or a RDI state in the monitoring points (MEP) of its own device. For example, the switching device SWe determines that a link connected to the ring port Pr[2] has a fault when the monitoring point MEPe2' recognizes the LOC state, and the switching device SWd determines that a link connected to the ring port Pr[1] has a fault when the monitoring point MEPd1' recognizes the RDI state. However, there is also a case where the RDI state is not included indetermination criteria of the presence or absence of fault in a link, and in this case, only the switching device SWe determines that the link has a fault.

Figure 16:
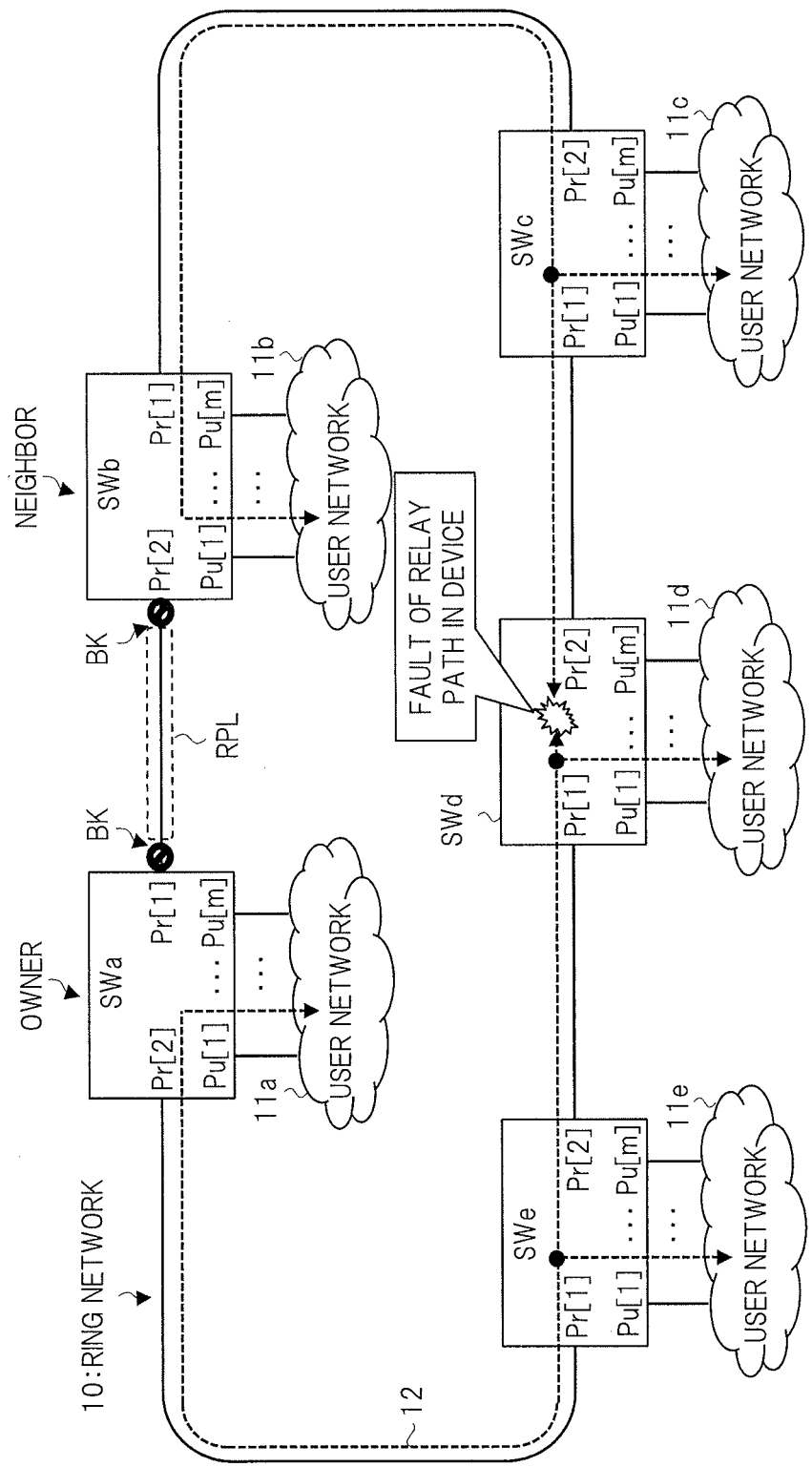
FIG. 16 is a schematic diagram illustrating an example of the problem in the relay system of FIG. 1 and FIG. 15.

FIG. 16 is a schematic diagram illustrating an example of the problem in the relay system of FIG. 1 and FIG. 15. In the example of FIG. 16, a fault has occurred in a relay path between the ring ports Pr[1] and Pr[2] inside the switching device SWd. However, such a fault sometimes does not have any influence on the monitoring points MEPd1' and MEPd2' of the switching device SWd illustrated in FIG. 2. In this case, the monitoring points MEPd1' and MEPd2' continue to transmit the CC frame.

Then, each of the remaining switching devices SWa, SWb, SWc and SWe cannot recognize the fault of the switching device SWd, and does not perform the path switching based on ITU-T G.8032. As a result, the frame transfer between each of the user networks 11a, 11b, 11c and 11e is performed on the communication path 12 like the case of FIG. 1. Thus, for example, the frame directed to the user network 11c from the user network 11e is blocked and lost in the switching device SWd.

<<Outline of Relay System (Present Embodiment)>>

Figure 2:
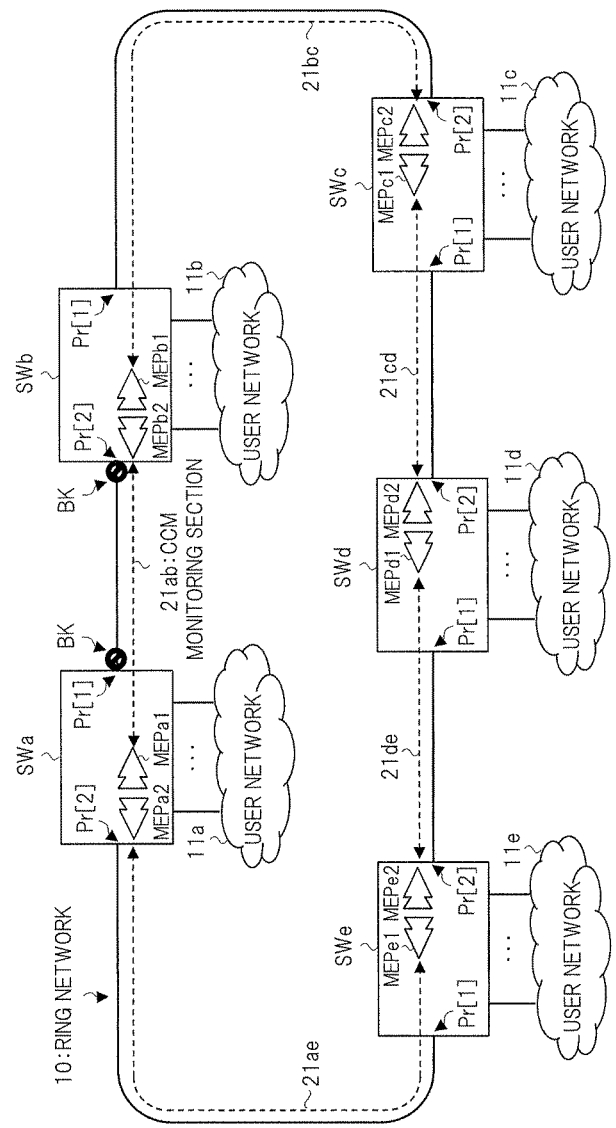
FIG. 2 is a schematic diagram illustrating an example of a fault monitoring method according to the first embodiment in the relay system of FIG. 1.
Figure 3:
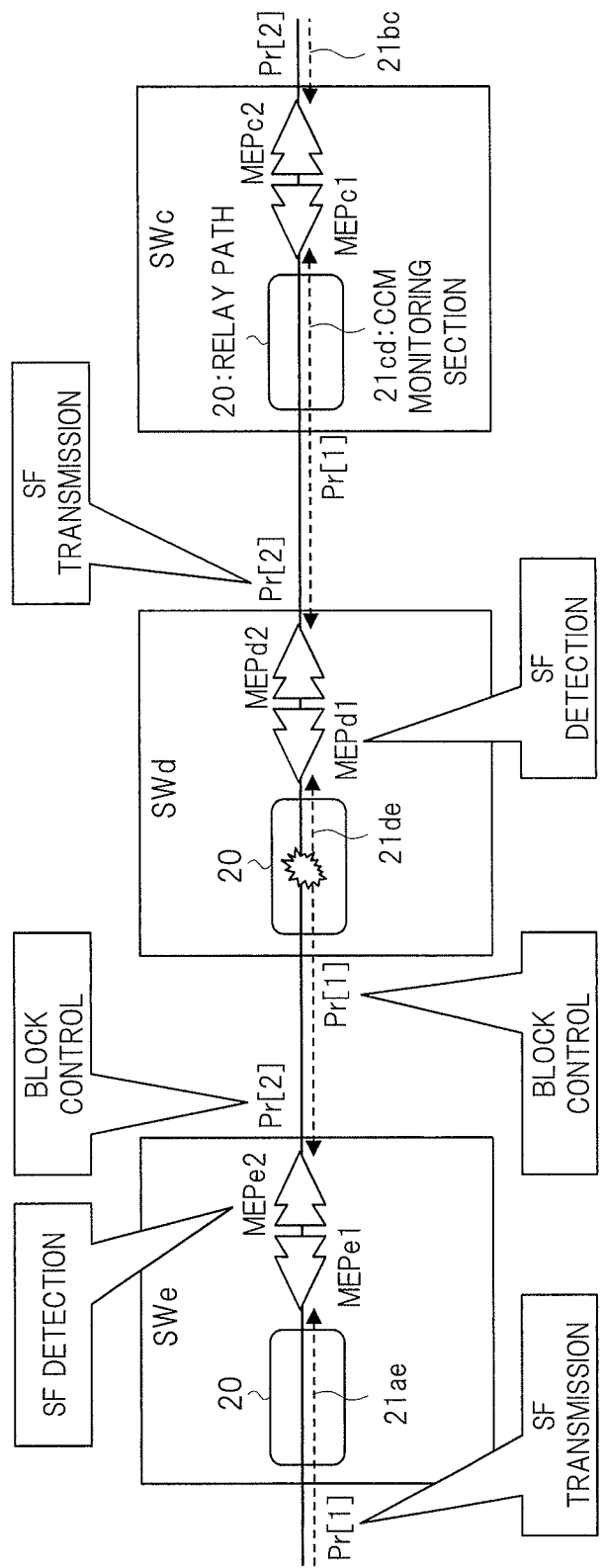
FIG. 3 is a schematic diagram illustrating a configuration example and an operation example in a part of the relay system of FIG. 2.

FIG. 2 is a schematic diagram illustrating an example of a fault monitoring method according to the first embodiment in the relay system of FIG. 1. FIG. 3 is a schematic diagram illustrating a configuration example and an operation example in a part of the relay system of FIG. 2. In the relay system of FIG. 2, each of the plurality of switching devices (relay devices) SWa to SWe is provided with monitoring points (second monitoring points) MEPa2 to MEPe2 similar to those of FIG. 15 and monitoring points (first monitoring points) MEPa1 to MEPe1 different from those of FIG. 15. The monitoring points (second monitoring points) MEPa2 to MEPe2 are referred to as Down MEPs or the like, and the monitoring points (first monitoring points) MEPa1 to MEPe1 are referred to as Up MEPs or the like.

In FIG. 3, parts corresponding to the switching devices SWc, SWd and SWe extracted from FIG. 2 are illustrated. Each of the switching devices SWc, SWd and SWe is provided with a relay path 20 for relaying a frame between the ring port (first port) Pr[1] and the ring port (second port) Pr[2]. The first monitoring point MEPc1 and the second monitoring point MEPc2 of the switching device SWc are provided on a side close to the ring port (second port) Pr[2] on the relay path 20 of the switching device SWc. Similarly, each of the monitoring points MEPd1 and MEPd2 of the switching device SWd is provided on a side close to the second port Pr[2] on the relay path 20 of the switching device SWd, and each of the monitoring points MEPe1 and MEPe2 of the switching device SWe is provided on a side close to the second port Pr[2] on the relay path 20 of the switching device SWe.

Here, the first monitoring point MEPd1 of the switching device SWd monitors the continuity between itself and the second monitoring point MEPe2 of a different device (SWe) through the relay path 20 of the switching device SWd by using the CCM frame. The second monitoring point MEPd2 of the switching device SWd monitors the continuity between itself and the first monitoring point MEPc1 of a different device (SWc) through the relay path 20 of the different switching device by using the CCM frame.

Similarly, the first monitoring point MEPc1 of the switching device SWc monitors the continuity between itself and the second monitoring point MEPd2 of a different device (SWd) through the relay path 20 of the switching device SWc by using the CCM frame. The second monitoring point MEPc2 of the switching device SWc monitors the continuity between itself and the first monitoring point MEPb1 of a different device (SWb) through the relay path 20 of the different switching device (see FIG. 2) by using the CCM frame. The same is true of the other switching devices SWa, SWb and SWe.

As a result, as illustrated in FIG. 2 and FIG. 3, the CCM monitoring sections different from those of FIG. 15 are set. Namely, a CCM monitoring section 21*ab* is set between the second port Pr[2] (first monitoring point MEPa1) of the switching device SWa and the second port Pr[2] (second monitoring point MEPb2) of the switching device SWb. A CCM monitoring section 21*bc* is set between the second port Pr[2] (MEPb1) of the switching device SWb and the second port Pr[2] (MEPc2) of the switching device SWc.

Similarly, a CCM monitoring section 21*cd* is set between the second port Pr[2] (first monitoring point MEPc1) of the switching device SWc and the second port Pr[2] (second monitoring point MEPd2) of the switching device SWd. A CCM monitoring section 21*de* is set between the second port Pr[2] (MEPd1) of the switching device SWd and the second port Pr[2] (MEPe2) of the switching device SWe. Then, a CCM monitoring section 21*ae* is set between the second port Pr[2] (MEPe1) of the switching device SWe and the second port Pr[2] (MEPa2) of the switching device SWa.

Here, in the example of FIG. 3, a fault has occurred in the relay path 20 of the switching device SWd. In this case, at least one (for example, MEPd1) of the first monitoring point MEPd1 of the switching device SWd and the second monitoring point MEPe2 of the switching device SWe does not receive the CCM frame from the other (MEPe2) within a predetermined period of time, and recognizes the continuity with respect to the other monitoring point as a LOC state. In this case, the other monitoring point (MEPe2) recognizes the continuity with respect to the one monitoring point (MEPd1) as a RDI state based on the RDI frame from the one monitoring point mentioned above. Note that both of the monitoring points (MEPd1 and MEPe2) may recognize the LOC state depending on a fault status of the relay path 20.

When the monitoring result at the first monitoring point MEPd1 is absence of continuity (that is, LOC state or RDI state), the switching device SWd (ring control unit therein (not shown)) detects a link fault (SF). In this case, the switching device SWd (ring control unit) controls the first port Pr[1] to a block state BK which prohibits the frame transmission, and transmits a R-APS (SF) frame from the second port Pr[2]. Here, the R-APS (SF) frame functions as a fault notification frame. SF denotes a signal failure (Signal Fail). The R-APS frame is a kind of a control frame based on Ethernet OAM, and is recognized by information of an OpCode region in the frame or the like.

Similarly, when the monitoring result at the second monitoring point MEPe2 is absence of continuity (that is, LOC state or RDI state), the switching device SWe (ring control unit therein (not shown)) detects a link fault (SF). In this case, the switching device SWe (ring control unit) controls the second port Pr[2] to the block state BK, and transmits a R-APS (SF) frame from the first port Pr[1].

Though not shown, in practice, the switching device SWd transmits the R-APS (SF) frame also from the first port Pr[1] controlled to the block state BK. However, the R-APS (SF) frame is blocked at the second port Pr[2] of the switching device SWe in the block state BK. Similarly, the switching device SWe transmits the R-APS (SF) frame also from the second port Pr[2] controlled to the block state BK. However, the R-APS (SF) frame is blocked at the first port Pr[1] of the switching device SWd in the block state BK.

<<Operation of Relay System at the Time of Fault Presence (Present Embodiment)>>

Figure 4:
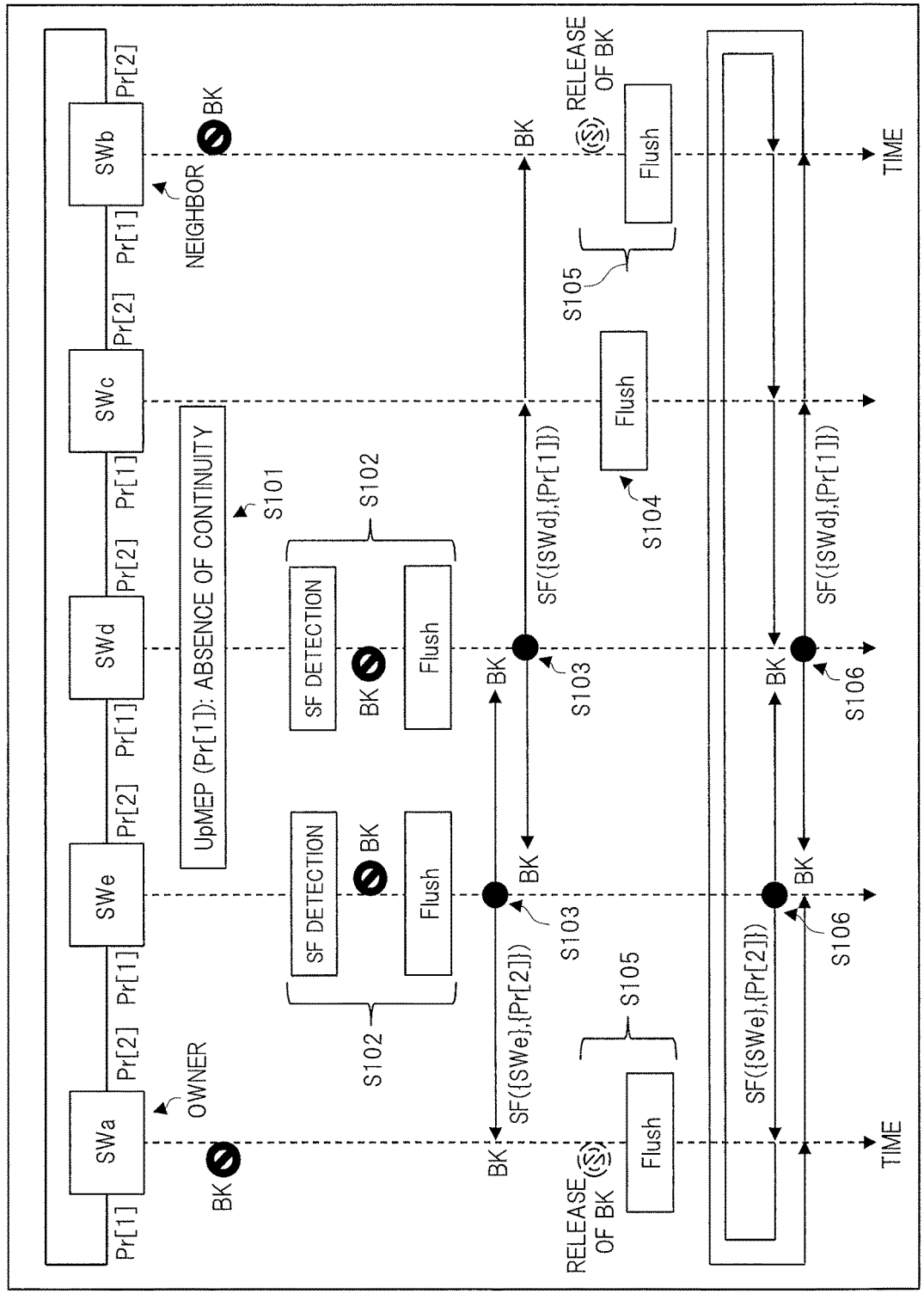
FIG. 4 is a diagram schematically illustrating an example of an operation sequence in the case where a fault inside the device illustrated in FIG. 3 occurs in the relay system of FIG. 2 and FIG. 3.

FIG. 4 is a diagram schematically illustrating an example of an operation sequence in the case where a fault inside the device illustrated in FIG. 3 occurs in the relay system of FIG. 2 and FIG. 3. In FIG. 4, first, the ring port Pr[1] of the switching device SWa serving as an owner node and the ring port Pr[2] of the switching device SWb serving as a neighbor node are both controlled to the block state BK. In this state, as illustrated in FIG. 3, the switching device SWd acquires the monitoring result of the absence of continuity from the first monitoring point MEPd1 serving as an Up MEP (Step S101).

By Step S101, the switching device SWd simulatively detects the fault inside the device based on the monitoring result at the first monitoring point MEPd1 as a fault (SF) of a link connected to the ring port Pr[1]. In response to this, the switching device SWd controls the ring port Pr[1] to the block state BK, and flushes (deletes) an address table (FDB (Forwarding DataBase)) (Step S102). In the same way, the switching device SWe also simulatively detects the fault inside the switching device SWd as a fault (SF) of a link connected to the ring port Pr[2]. In response to this, the switching device SWe controls the ring port Pr[2] to the block state BK, and flushes (deletes) the address table (FDB) (Step S102).

Subsequently, the switching device SWd which has detected the fault (SF) transmits a R-APS (SF) frame containing information of the ring port controlled to the block state BK to the ring network 10 (Step S103). The information of the ring port controlled to the block state BK contains an identifier of the switching device SWd {SWd} and an identifier of the ring port Pr[1] {Pr[1]}. In this way, in the present specification, {AA} is assumed to denote an identifier of "AA". Similarly, the switching device SWe also transmits a R-APS (SF) frame containing information of the ring port controlled to the block state BK ({SWe}/{Pr[2]}) to the ring network 10 (Step S103).

The R-APS (SF) frames transmitted by the switching devices SWd and SWe are relayed by each switching device until reaching a ring port in the block state BK. Here, when the switching device SWc has received the R-APS (SF) frame, the switching device SWc flushes (deletes) the address table (FDB) (Step S104). Also, when the switching device SWa serving as an owner node has received the R-APS (SF) frame, the switching device SWa releases the block state BK of the ring port Pr[1] (that is, changes the state into an open state), and flushes (deletes) the address table (FDB) (Step S105).

In the same way, when the switching device SWb serving as a neighbor node has received the R-APS (SF) frame, the switching device SWb releases the block state BK of the ring port Pr[2] (that is, changes the state into an open state), and flushes (deletes) the address table (FDB) (Step S105). After that, the R-APS (SF) frame is transmitted at regular intervals by the switching devices SWd and SWe, and a steady state is reached (Step S106).

Figure 5:
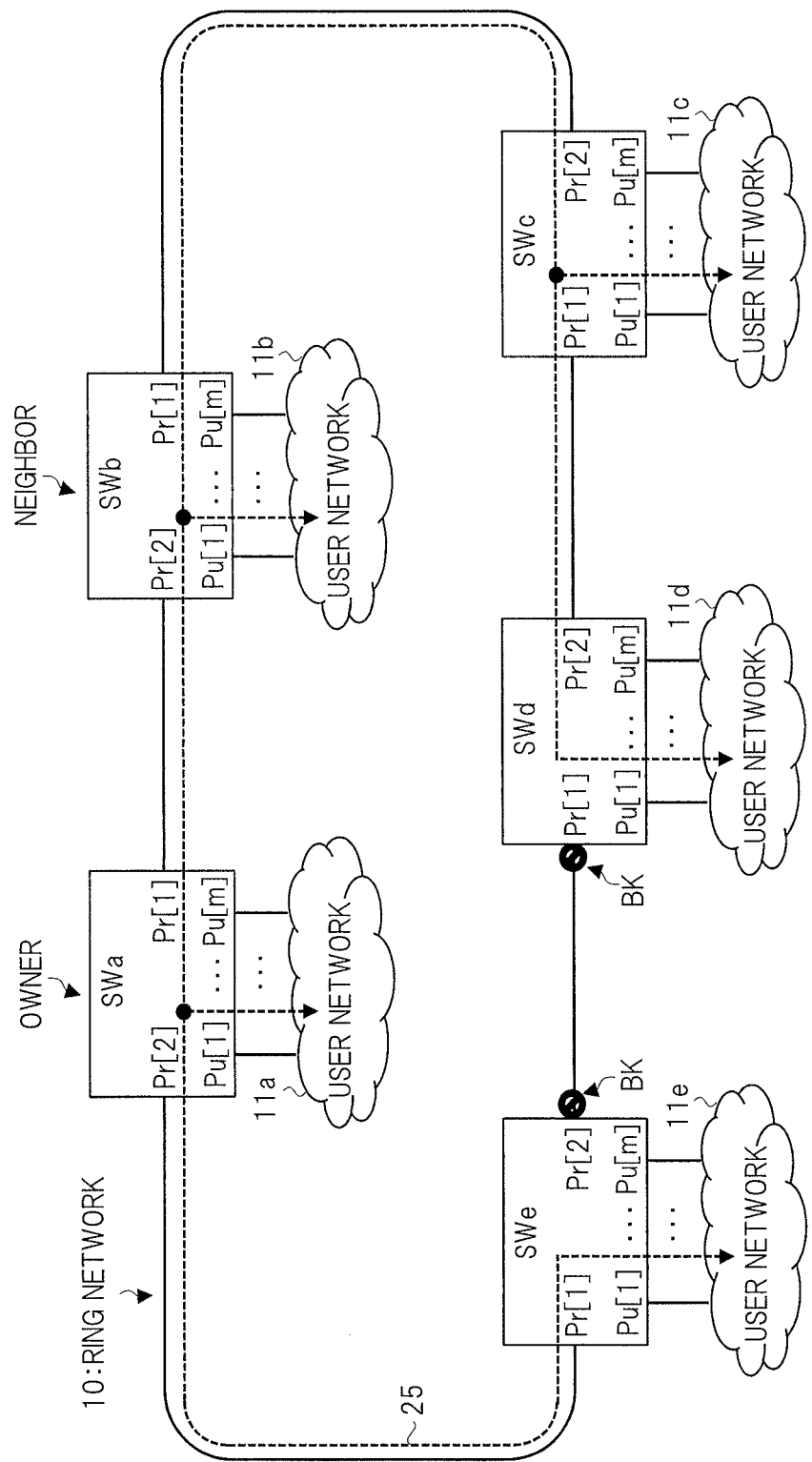
FIG. 5 is a diagram illustrating a frame transfer path after path switching of the ring network is performed by the operation of FIG. 4.

FIG. 5 is a diagram illustrating a frame transfer path after path switching of the ring network is performed by the operation of FIG. 4. When the operation of FIG. 4 has been executed and the steady state (Step S106) has been reached, a communication path 25 via the switching devices SWa, SWb and SWc is formed between the switching device SWe and the switching device SWd as illustrated in FIG. 5. The frame transfer between the user networks 11*a* to 11*e* is performed on this communication path 25. As a result, for example, a frame directed to the user network 11c from the user network 11e reaches the user network 11c without being lost via the communication path 25 unlike the case of FIG. 16.

<<Operation of Relay System at the Time of Fault Recovery (Present Embodiment)>>

Figure 6:
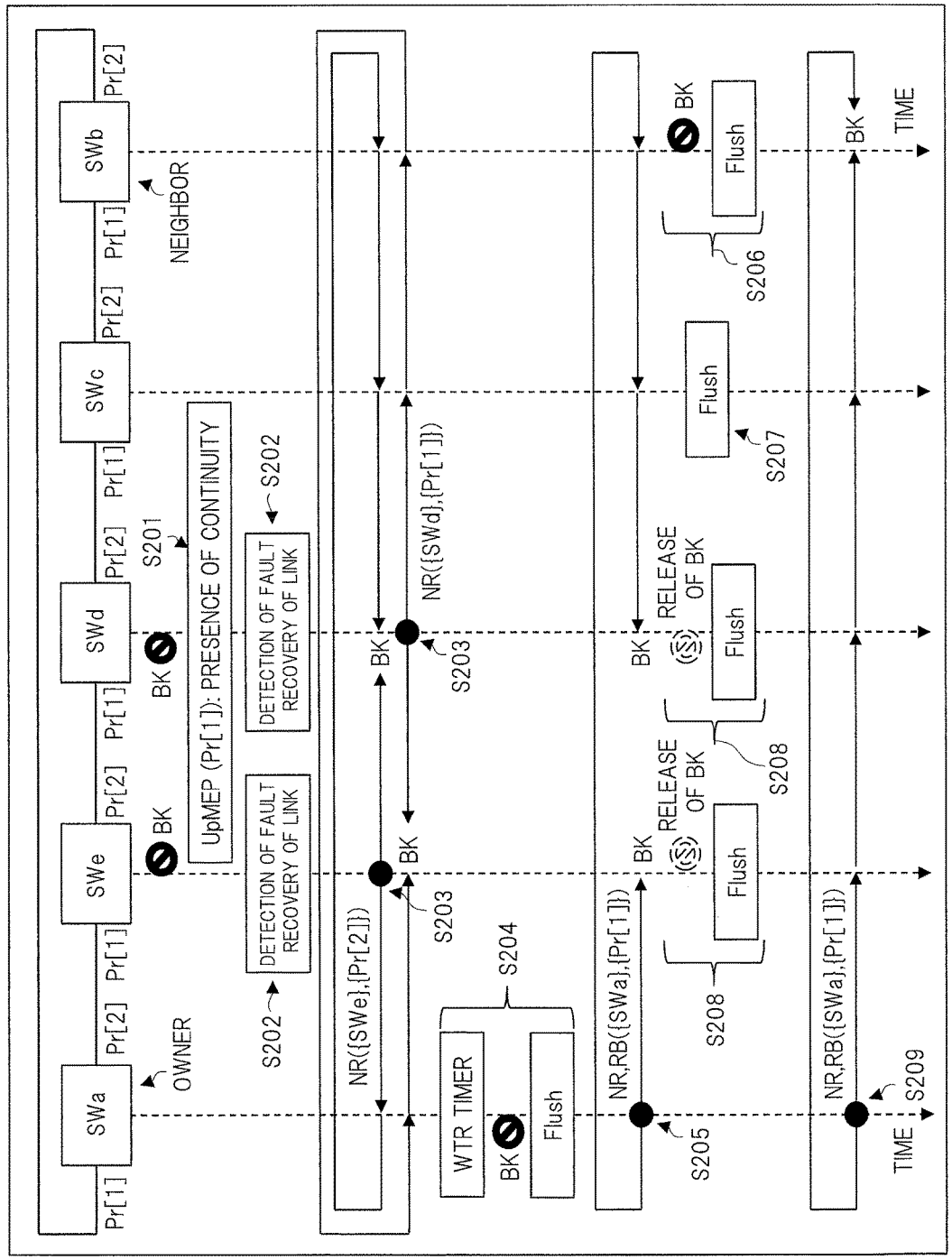
FIG. 6 is a diagram schematically illustrating an example of an operation sequence in the case where the fault inside the device illustrated in FIG. 3 has been recovered in the relay system of FIG. 2 and FIG. 3.

FIG. 6 is a diagram schematically illustrating an example of an operation sequence in the case where the fault inside the device illustrated in FIG. 3 has been recovered in the relay system of FIG. 2 and FIG. 3. In FIG. 6, first, the ring port Pr[1] of the switching device SWd and the ring port Pr[2] of the switching device SWe are both controlled to the block state BK as shown in FIG. 4 and FIG. 5. In this state, the switching device SWd acquires the monitoring result of presence of continuity from the first monitoring point MEPd1 serving as an Up MEP (Step S201).

By Step S201, the switching device SWd simulatively detects the fault recovery inside the device based on the monitoring result at the first monitoring point MEPd1 as a fault recovery of a link connected to the ring port Pr[1] (step S202). In the same way, the switching device SWe also simulatively detects the fault recovery inside the switching device SWd based on the monitoring result at the second monitoring point MEPe2 as a fault recovery of a link connected to the ring port Pr[2] (step S202).

When the switching device SWd has detected the fault recovery, the switching device SWd transmits a R-APS (NR) frame containing information ({SWd}/{Pr[1]}) of the ring port controlled to the block state BK from both of the ring ports Pr[1] and Pr[2] (Step S203). Here, the R-APS (NR) frame functions as a fault recovery notification frame. NR denotes absence of request (No Request). Similarly, when the switching device SWe has detected the fault recovery, the switching device SWe transmits a R-APS (NR) frame containing information ({SWe}/{Pr[2] }) of the ring port controlled to the block state BK from both of the ring ports Pr[1] and Pr[2] (Step S203).

The R-APS (NR) frame transmitted by the switching devices SWd and SWe is relayed by each switching device until reaching a ring port in the block state BK. Here, when the switching device SWa serving as an owner node has received the R-APS (NR) frame, the switching device SWa starts a WTR (Wait to Restore) timer. The switching device SWa controls the ring port Pr[1] to the block state BK when a new request is not received within a period of the WTR timer, and flushes (deletes) the address table (FDB) (Step S204).

Thereafter, the switching device SWa transmits a R-APS (NR and RB) frame containing information of the ring port controlled to the block state BK ({SWa}/{Pr[1]}) to the ring network 10 (Step S205). Here, the R-APS (NR and RB) frame functions as a fault switch-back frame. RB denotes the block of RPL (RPL Blocked). The R-APS (NR and RB) frame transmitted by the switching device SWa is relayed by each switching device until reaching a ring port in the block state BK.

Here, when the switching device SWb serving as a neighbor node has received the R-APS (NR and RB) frame, the switching device SWb controls the ring port Pr[2] to the block state BK, and flushes (deletes) the address table (FDB) (Step S206). In addition, when the switching device SWc has received the R-APS (NR and RB) frame, the switching device SWc flushes (deletes) the address table (FDB) (Step S207).

Furthermore, when the switching device SWd has received the R-APS (NR and RB) frame, the switching device SWd releases the block state BK of the ring port Pr[1], and flushes (deletes) the address table (FDB) (Step S208). In the same way, when the switching device SWe has received the R-APS (NR and RB) frame, the switching device SWe releases the block state BK of the ring port Pr[2], and flushes (deletes) the address table (FDB) (Step S208).

After that, the R-APS (NR and RB) frame is transmitted at regular intervals by the switching device SWa, and a steady state is reached (Step S209). As a result, the state returns to that illustrated in FIG. 1. Note that, when the R-APS frame is newly transmitted, for example, it is transmitted 3 times every 3.3 ms, and is thereafter transmitted every 5 s.

As mentioned above, by using the relay system and relay device (switching device) of FIG. 2, FIG. 3 and others, it becomes possible to switch a communication path in the ring network appropriately in accordance with an internal fault of the relay device. As a result, it is possible to prevent the frame loss and the like. Such an effect becomes advantageous particularly when a ring protocol specified by ITU-T G.8032 is used. Note that, although the case where an internal fault occurs in the switching device SWd has been taken as an example in FIG. 3 and FIG. 4, even when the internal fault occurs in the other switching devices SWa, SWb, SWc and SWe in FIG. 2, the internal fault is detected by the corresponding first and second monitoring points and the communication path in the ring network is switched in the same manner.

<<Configuration of Relay Device (Present Embodiment)>>

Figure 7:
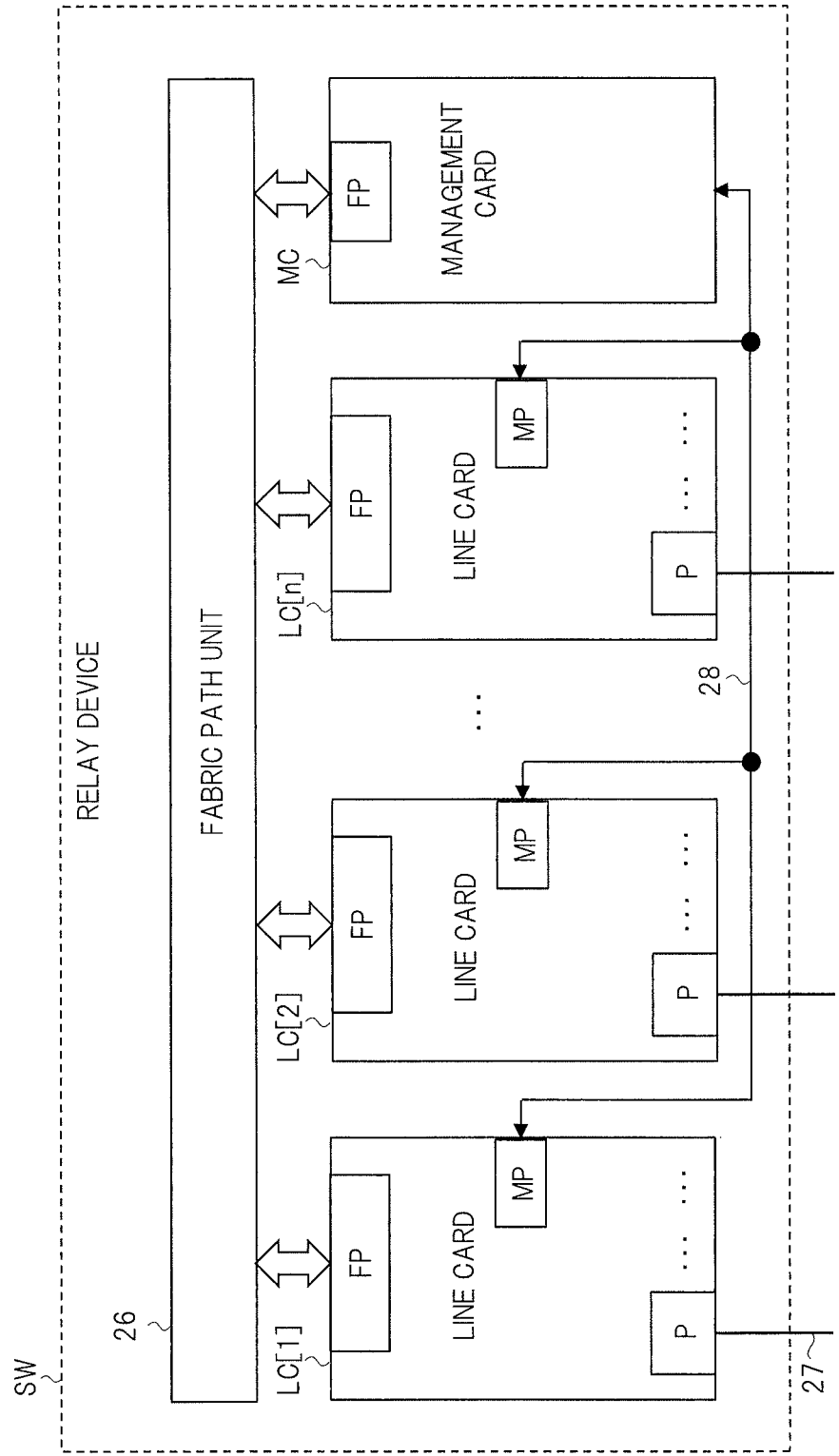
FIG. 7 is a schematic diagram illustrating a configuration example of the switching device (relay device) in the relay system of FIG. 2 and FIG. 3.

FIG. 7 is a schematic diagram illustrating a configuration example of the switching device (relay device) in the relay system of FIG. 2 and FIG. 3. In this case, the switching device (relay device) SW illustrated in FIG. 7 is a chassis type switching device in which a plurality of cards are mounted in one chassis. Although this switching device SW corresponds to the switching device SWd of FIG. 3, it is not limited to this and may be any of the other switching devices SWa, SWb, SWc and SWe of FIG. 2.

The switching device (relay device) SW of FIG. 7 is provided with a plurality of (here, n) line cards LC[1] to LC[n], a management card MC, and a fabric path unit 26. Each of the line cards LC[1] to LC[n] performs frame communication (transmission and reception) with the outside of the device. The fabric path unit 26 relays the frame between the plurality of line cards LC[1] to LC[n]. In addition, in this case, the fabric path unit 26 relays the frame also between the plurality of line cards LC[1] to LC[n] and the management card MC.

The management card MC manages the n line cards LC[1] to LC[n] and others. Only one management card MC is illustrated here, but actually, a plurality of management cards MC are provided for enhancing availability. Each of the line cards LC[1] to LC[n] is provided with one or a plurality of external ports P, a fabric terminal FP, and a management card terminal MP. Each external port P corresponds to any of the ring ports Pr[1] and Pr[2] and the user ports Pu[1] to Pu[m] of FIG. 1, and is connected to a communication line 27 such as an Ethernet line. The management card terminal MP is connected to the management card MC via a management communication line 28.

The fabric terminal FP is connected to the fabric path unit 26, and is connected to the fabric terminals FP of other line cards (and management card) via the fabric path unit 26. Here, for example, the fabric path unit 26 may be made up of a fabric card having a switching function, and may be made up of a wiring board (backplane) in which slots for detaching and attaching each card are provided.

When the fabric path unit 26 is made up of a fabric card, the fabric terminal FP is connected to the fabric card, and is connected to the fabric terminals FP of other line cards through switching by the fabric card. When the fabric path unit 26 is made up of a backplane, the fabric terminal FP is made up of a plurality of terminals, and the plurality of terminals are respectively connected to the corresponding terminals of other line cards (and management card) via a full-mesh communication line provided on the backplane.

Figure 8:
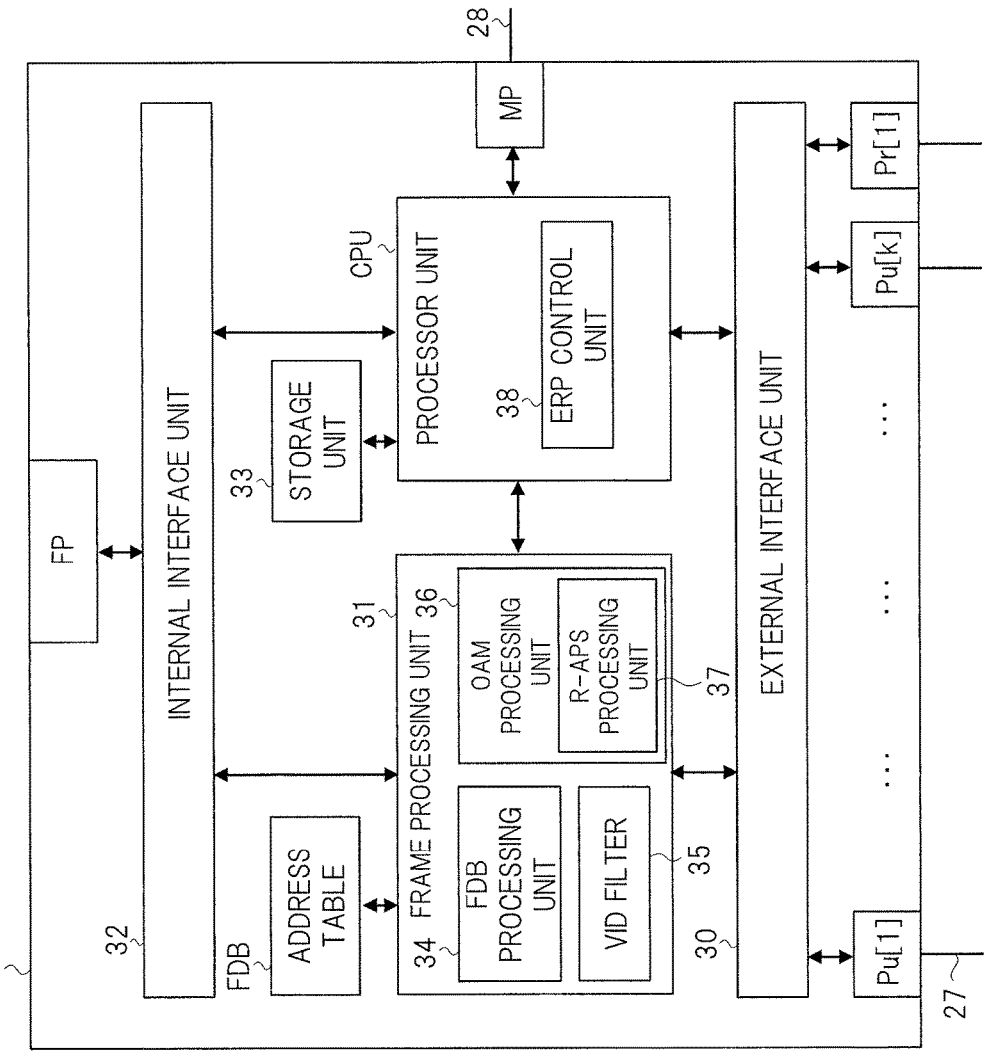
FIG. 8 is a block diagram illustrating a configuration example of each line card in the relay device of FIG. 7.

FIG. 8 is a block diagram illustrating a configuration example of each line card in the relay device of FIG. 7. In FIG. 8, for convenience of description, a case where k user ports Pu[1] to Pu[k] and one ring port Pr[1] are mounted as the external ports P on one line card LC is taken as an example. However, actually, it is possible to freely determine on which of the line cards LC[1] to LC[n] each of the ring ports Pr[1] and Pr[2] and the user ports Pu[1] to Pu[m] is mounted.

In FIG. 8, when an external interface unit 30 has received a frame at any of the user ports Pu[1] to Pu[k] and the ring port Pr[1], it adds a port identifier (referred to as a reception port identifier) indicating the line card and external port which have received the frame, and then transmits it to a frame processing unit 31 or a processor unit CPU. In addition, the external interface unit 30 transmits a frame from the frame processing unit 31 or the processor unit CPU to any of the user ports Pu[1] to Pu[k] and the ring port Pr[1] based on a destination port identifier described later.

An internal interface unit 32 controls frame communication between the frame processing unit 31 or the processor unit CPU and the fabric terminal FP. The address table FDB retains a correspondence relation among the port identifier, a MAC (Media Access Control) address of a terminal device or the like present ahead of a line card and external port indicated by the port identifier, and a VLAN (Virtual LAN) identifier (VID) corresponding to the MAC address. The frame processing unit 31 is provided with an FDB processing unit 34, a VID filter 35 and an OAM processing unit 36.

When the FDB processing unit 34 has received a frame (for example, user frame) at any of the user ports Pu[1] to Pu[k] and the ring port Pr[1], the FDB processing unit 34 performs learning of the address table FDB and retrieval of the destination of the frame based on the address table FDB. Concretely, when the FDB processing unit 34 has received a user frame via the external interface unit 30, the FDB processing unit 34 learns a source MAC address contained in the user frame in association with the reception port identifier and the VLAN identifier to the address table FDB.

In addition, the FDB processing unit 34 retrieves the address table FDB by using the destination MAC address contained in the user frame received via the external interface unit 30 and the VLAN identifier corresponding thereto as retrieval keys. The FDB processing unit 34 adds a port identifier (referred to as a destination port identifier) acquired by this retrieval result to a user frame together with the reception port identifier mentioned above. The destination port identifier is made up of an identifier of a destination line card and an identifier of a destination external port.

The VID filter 35 determines whether or not a frame may be relayed in accordance with the VLAN identifier. For example, the block state BK illustrated in FIG. 1 and others is realized by this VID filter 35. The OAM processing unit 36 is provided with the first and second monitoring points (for example, MEPd1 and MEPd2) illustrated in FIG. 2 and FIG. 3, and monitors the continuity and determines presence or absence of the continuity based on Ethernet OAM. In addition, the OAM processing unit 36 is provided with a R-APS processing unit 37. The R-APS processing unit 37 performs the process of the R-APS frame based on ITU-T G.8032 (specifically, transmission, reception and relaying).

The processor unit CPU performs the various communication protocol processes, for which complicated process is required, in cooperation with the frame processing unit 31 or manages its own line card based on software (firmware) stored in a storage unit 33. The processor unit CPU is provided with an ERP control unit (ring control unit) 38 configured by executing firmware. The ERP control unit (ring control unit) 38 controls the ring network based on the ring protocol specified by ITU-T G.8032. In addition, the processor unit CPU communicates with the management card MC via the management card terminal MP.

<<User Frame Relaying Operation of Relay Device (Present Embodiment)>>

Figure 9:
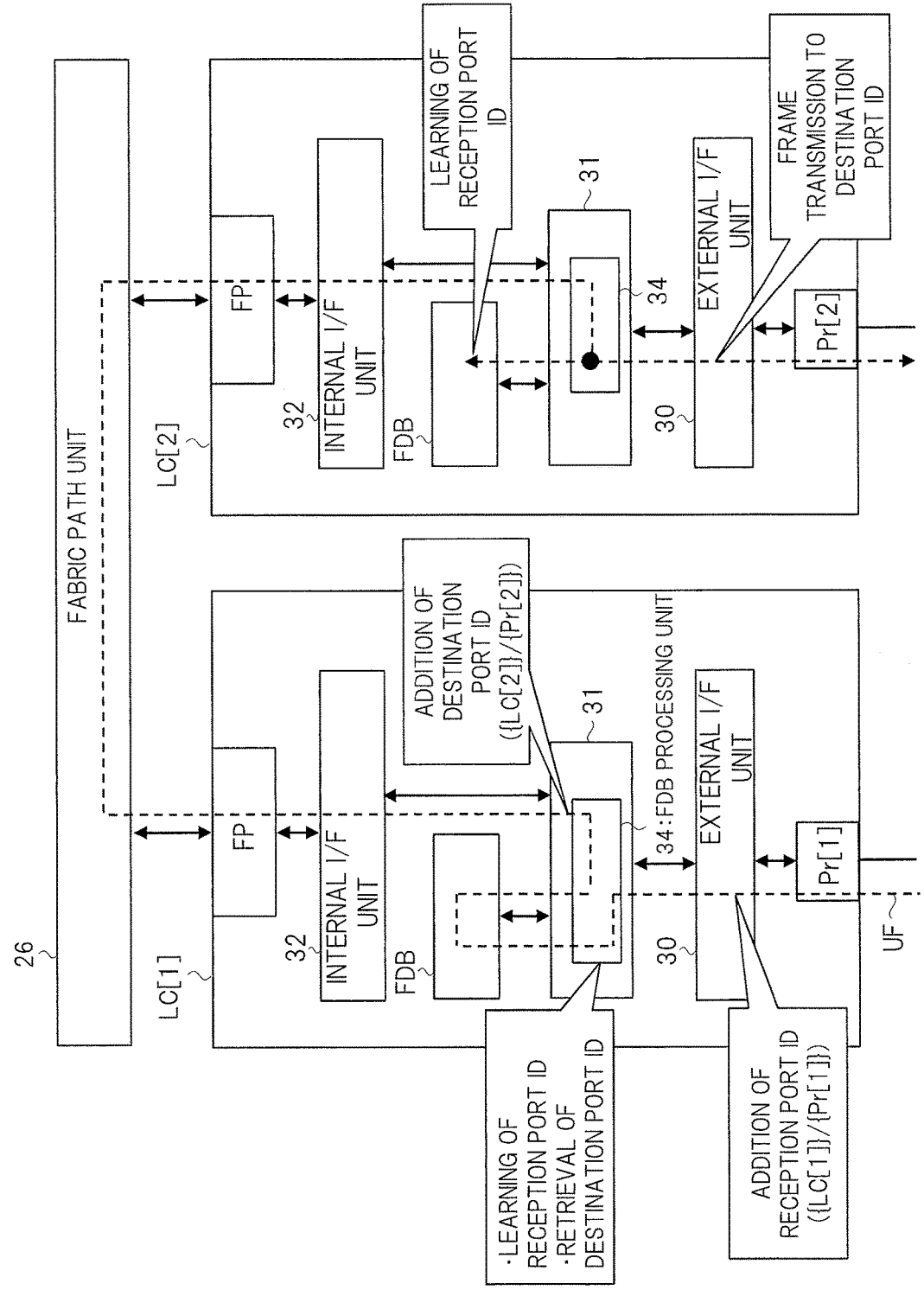
FIG. 9 is an explanatory diagram schematically illustrating an operation example at the time of relaying a user frame in the relay device of FIG. 7 and FIG. 8.

FIG. 9 is an explanatory diagram schematically illustrating an operation example at the time of relaying a user frame in the relay device of FIG. 7 and FIG. 8. Here, it is assumed that the line card LC[1] is provided with the ring port (first port) Pr[1], and the line card LC[2] is provided with the ring port (second port) Pr[2]. Then, the case where a user frame received at the ring port Pr[1] of the line card LC[1] is relayed to the ring port Pr[2] of the line card LC[2] is assumed.

First, the external interface unit 30 of the line card LC[1] adds the reception port identifier {LC[1]}/{Pr[1]} to a user frame UF received at the ring port Pr[1], and then transmits the user frame to the frame processing unit 31. The FDB processing unit 34 in the frame processing unit 31 learns a correspondence relation among the source MAC address contained in the user frame UF, the VLAN identifier determined by a tag VLAN, port VLAN and others, and the reception port identifier {LC[1]}/{Pr[1]} to the address table FDB.

In addition, the FDB processing unit 34 retrieves the address table FDB by using the destination MAC address contained in the user frame UF and the VLAN identifier as retrieval keys, and acquires the destination port identifier. Here, it is presupposed that the destination port identifier {LC[2]}/{Pr[2]} is acquired as the retrieval result associated with the learning of the address table FDB in the past communication. The FDB processing unit 34 adds the reception port identifier and the destination port identifier to the user frame UF, and transmits it to the fabric terminal FP via the internal interface unit 32.

Note that, at this time, the frame processing unit 31 discards the user frame UF without transmitting it to the fabric terminal FP if the VLAN identifier of the user frame UF is not allowed to be relayed by the setting of the VID filter 35. In addition, the FDB processing unit 34 relays the user frame UF to the user port if an identifier of the user port provided in its own line card is acquired as the destination port identifier. A specific relay method may be, for example, a method of looping back the frame at the internal interface unit 32 or the fabric path unit 26 as well as a method of looping back the frame at the frame processing unit 31.

The description returns to the operation of FIG. 9. The fabric path unit 26 relays the user frame UF from the fabric terminal FP of the line card LC[1] to the fabric terminal FP of the line card LC[2]. For example, when the fabric path unit 26 is made up of the fabric card, the fabric card relays the user frame UF to the line card LC[2] based on the destination port identifier {LC[2]}/{Pr[2]}. On the other hand, when the fabric path unit 26 is made up of the backplane, the internal interface unit 32 of the line card LC[1] transmits the user frame UF to the terminal corresponding to the line card LC[2] from among each of the terminals constituting the fabric terminal FP based on the destination port identifier {LC[2]}/{Pr[2]}.

The line card LC[2] transmits the user frame UF received at the fabric terminal FP to the frame processing unit 31 via the internal interface unit 32. The FDB processing unit 34 in the frame processing unit 31 learns the correspondence relation among the source MAC address contained in the user frame UF, the VLAN identifier contained (or added) in the user frame UF and the reception port identifier added to the user frame UF to the address table FDB. The external interface unit 30 of the line card LC[2] receives the user frame UF from the frame processing unit 31, and transmits the user frame UF to the ring port Pr[2] based on the destination port identifier added thereto.

Note that an operation example in which each line card performs learning of the address table FDB based on the user frame has been described here, but alternatively it is also possible to configure each line card so as to perform the learning by using a learning frame. In this case, the frame processing unit 31 of the line card LC[1] generates the learning frame containing the source MAC address of the user frame UF, the VLAN identifier and the reception port identifier, and transmits it to the other line cards LC[2] (and LC[3] to LC[n]). The frame processing units 31 of the other line cards LC[2] (and LC[3] to LC[n]) learn the correspondence relation among the source MAC address, the VLAN identifier and the reception port identifier contained in the learning frame to the address table FDB.

<<Ring Protocol Operation of Relay Device (Present Embodiment)>>

Figure 10:
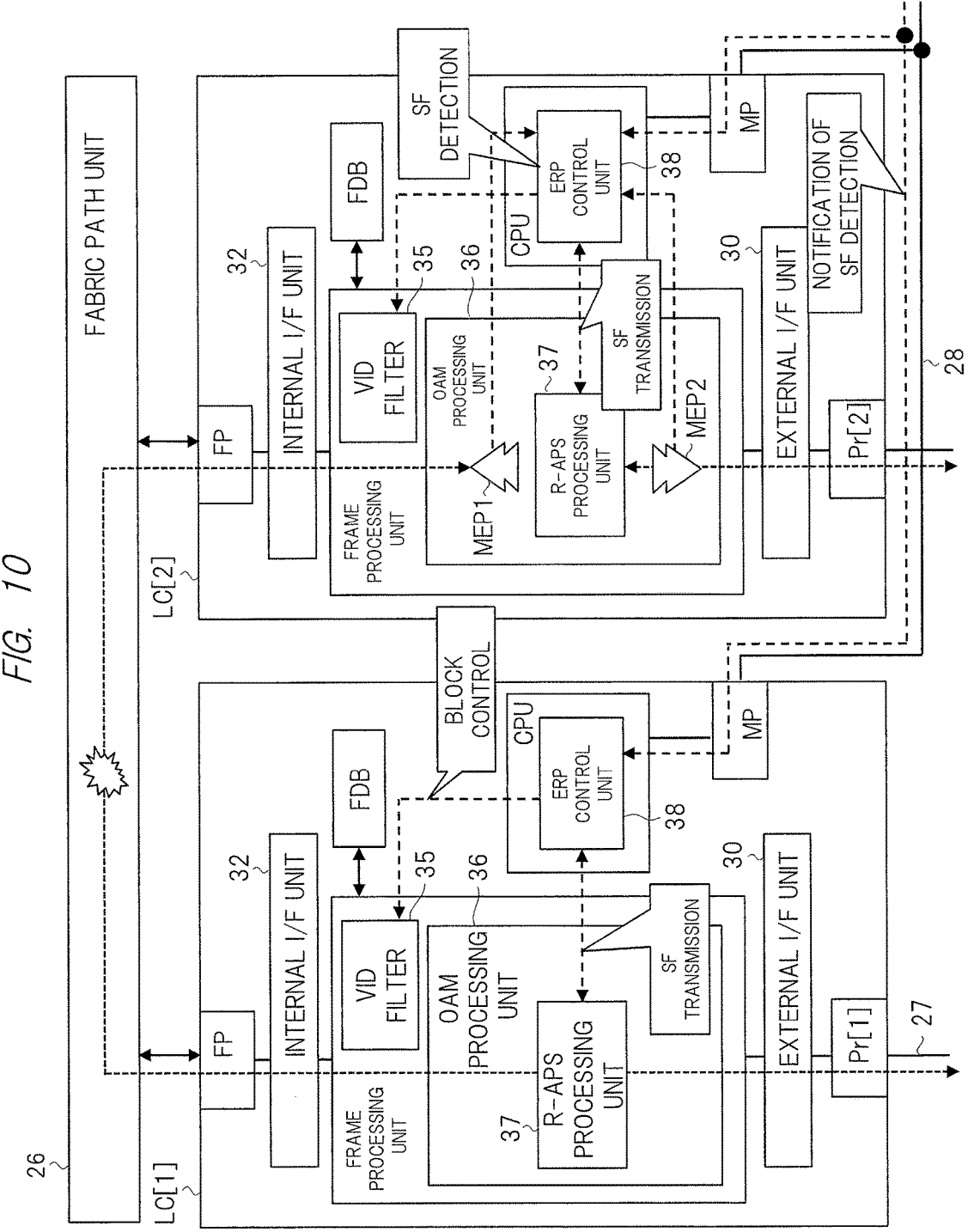
FIG. 10 is an explanatory diagram schematically illustrating an operation example around the OAM processing unit and the ERP control unit in the relay device of FIG. 7 and FIG. 8.

FIG. 10 is an explanatory diagram schematically illustrating an operation example around the OAM processing unit and the ERP control unit in the relay device of FIG. 7 and FIG. 8. In FIG. 10, the line card LC[1] is provided with the ring port (first port) Pr[1], and the line card LC[2] is provided with the ring port (second port) Pr[2] like the case of FIG. 9. The OAM processing unit 36 of the line card LC[2] has a first monitoring point MEP1, a second monitoring point MEP2 and a R-APS processing unit (second R-APS processing unit) 37. On the other hand, the OAM processing unit 36 of the line card LC[1] has a R-APS processing unit (first R-APS processing unit) 37.

In the line card LC[2], the first monitoring point MEP1 generates a CCM frame at regular intervals and transmits the CCM frame from the first port Pr[1] of the line card LC[1] via the fabric path unit 26. Though not particularly limited, for example, the correspondence relation between the identifier of the first port Pr[1] ({LC[1]}/{Pr[1]}) and a MAC address of a monitoring point of a different device connected to the first port has been learned to the address table FDB of the line card LC[2]. The first monitoring point MEP1 transmits the CCM frame to the first port Pr[1] based on the retrieval result of the address table FDB.

Also, the first monitoring point MEP1 receives the CCM frame, which is received at the first port Pr[1] from a monitoring point of a different device, via the fabric path unit 26. Though not particularly limited, for example, the correspondence relation between the identifier of the line card LC[2] ({LC[2]}) and a MAC address of the first monitoring point MEP1 has been learned to the address table FDB of the line card LC[1]. When the OAM processing unit 36 of the line card LC[1] has received the frame at the first port Pr[1], it determines that the frame is a CCM frame based on various identifiers and others in the frame, and relays the CCM frame based on the retrieval result of the address table FDB. As a result, the CCM frame is received at the first monitoring point MEP1.

As described above, the communication path of the CCM frame by the first monitoring point MEP1 overlaps with the communication path of the user frame UF illustrated in FIG. 9, and overlaps with the relay path 20 of the frame between the first port Pr[1] and the second port Pr[2] in the switching device SWd illustrated in FIG. 3. FIG. 10 illustrates an operation example in the case where a fault occurs in the fabric path unit 26.

In this case, in the line card LC[2], the first monitoring point MEP1 notifies the ERP control unit (ring control unit) 38 of the monitoring result of absence of continuity. In response to this, the ERP control unit 38 detects the fault (SF) of the link. The ERP control unit 38 generates predetermined control information to be stored in the R-APS (SF) frame, and instructs the R-APS processing unit 37 to transmit the R-APS (SF) frame. In response to this, the R-APS processing unit 37 transmits the R-APS (SF) frame from the second port Pr[2] via the second monitoring point MEP2.

Also, in parallel with this, the ERP control unit (ring control unit) 38 of the line card LC[2] notifies the ERP control unit (ring control unit) 38 of the line card LC[1] that the fault (SF) is detected at the first monitoring point MEP1. This is notified through, for example, a management card (not shown) by using the management communication line 28. In the line card LC[1], the ERP control unit 38 controls the first port Pr[1] to the block state BK in accordance with the fault notification from the ERP control unit 38 of the line card LC[2]. Specifically, the ERP control unit 38 sets the conditions of prohibiting the frame transmission (for example, first port Pr[1], VLAN identifier and the like) to the VID filter 35.

Also, in the line card LC[1], the ERP control unit 38 generates predetermined control information to be stored in the R-APS (SF) frame in response to the fault notification from the ERP control unit 38 of the line card LC[2], and instructs the R-APS control unit 37 to transmit the R-APS (SF) frame. In response to this, the R-APS processing unit 37 transmits the R-APS (SF) frame from the first port Pr[1].

As described above, in the example of FIG. 10, the R-APS processing unit 37 corresponding to the first port Pr[1] is mounted on the line card LC[1] having the first port Pr[1], and the first monitoring point MEP1 corresponding to the first port Pr[1] is mounted on the line card LC[2] having the second port Pr[2]. Here, for example, the R-APS processing unit 37 corresponding to the first port Pr[1] may be mounted on the same line card LC[2] as the first monitoring point MEP1. In this case, however, when a fault occurs in the fabric path unit 26 like the case of FIG. 10, the R-APS processing unit 37 cannot appropriately perform the transmission and reception of the R-APS frame based on ITU-T G.8032 in some cases. Thus, it is desired to use the configuration example illustrated in FIG. 10.

Although the ring protocol operation in the case where a fault (SF) is detected from the monitoring result at the first monitoring point MEP1 has been described here, the OAM processing unit 36 and the ERP control unit 38 perform also various types of other ring protocol operations in accordance with the state of the ring network. Typically, when the R-APS processing unit 37 has received the R-APS frame, it notifies the ERP control unit 38 of it, and the ERP control unit 38 confirms the various types of control information contained in the R-APS frame and performs the operation in accordance with the various types of control information. Also, the R-APS processing unit 37 transmits the R-APS frame in accordance with the instruction of the ERP control unit 38. At this time, the ERP control unit 38 generates various types of control information to be stored in the R-APS frame.

The various types of control information mentioned here is various types of information specified by ITU-T G.8032 typified by SF, NR, RB and others as illustrated in FIG. 4 and FIG. 6. The operation in accordance with the various types of control information is various types of operations specified by ITU-T G.8032 typified by the control of the block state BK to the ring port (control of VID filter 35), issuance of a flush instruction to the address table FDB, and relay control of the R-APS frame as illustrated in FIG. 4 and FIG. 6.

As mentioned above, by using the relay system and relay device of the present first embodiment, typically, an appropriate path switching in accordance with the internal fault of the relay device can be realized. This effect becomes advantageous particularly when the ring protocol specified by ITU-T G.8032 is used. Note that, although the case where the chassis type switching device (relay device) is used has been taken as an example here, a box type switching device may be used. The box type switching device has an overall configuration obtained by, for example, deleting the internal interface unit 32 and others from the configuration illustrated in FIG. 8.

However, when a box type switching device is used, for example, a candidate of a specific fault location of the relay path 20 between ring ports illustrated in FIG. 3 will be the frame processing unit 31 of FIG. 8. This case results in a state where a transmitting operation of each monitoring point stops, and the fault detection is likely to be performed by the switching devices SWc and SWe of FIG. 3. On the other hand, when the chassis type switching device is used, since there are many candidates of specific fault locations of the relay path 20 between ring ports, a situation where a monitoring point operates normally irrespective of the fault is likely to arise. Therefore, in this viewpoint, a more advantageous effect is acquired when the chassis type switching device is used.

Second Embodiment

<<Configuration of Relay System (Modification Example)>>

Figure 11:
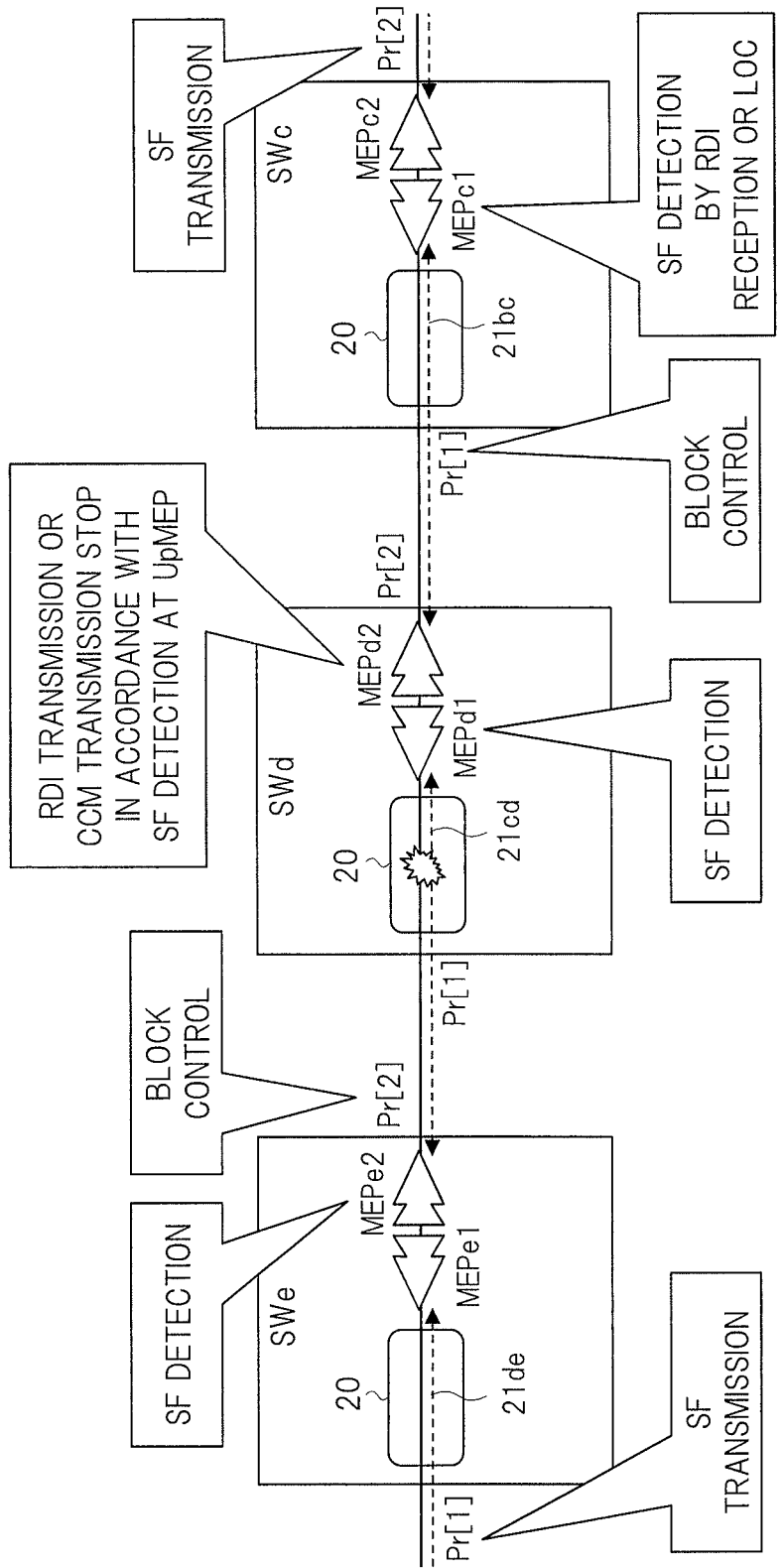
FIG. 11 is a schematic diagram illustrating an operation example, which is different from that of FIG. 3 using the configuration example of FIG. 2, in a relay system according to the second embodiment of the present invention.

FIG. 11 is a schematic diagram illustrating an operation example, which is different from that of FIG. 3 using the configuration example of FIG. 2, in a relay system according to the second embodiment of the present invention. In FIG. 11, like the case of FIG. 3, parts corresponding to the switching devices SWc, SWd and SWe extracted from FIG. 2 are illustrated, and a fault occurs in the relay path 20 of the switching device SWd. In this case, the switching device SWe performs the operation similar to that of the case of FIG. 3. More specifically, the switching device SWe detects the fault (SF) via the second monitoring point MEPe2 to control the second port Pr[2] to the block state BK and transmit the R-APS (SF) frame from the first port Pr[1] (and second port Pr[2]).

Meanwhile, the switching device SWd (ring control unit therein (not shown)) detects the fault (SF) via the first monitoring point MEPd1 like the case of FIG. 3, but it performs an operation different from that of the case of FIG. 3 in response to it. More specifically, when the ring control unit has detected the fault (SF) via the first monitoring point MEPd1 (in other words, when the monitoring result at the first monitoring point MEPd1 is absence of continuity), it instructs the second monitoring point MEPd2 to transmit the RDI frame or instructs the second monitoring point MEPd2 to stop the transmission of the CCM frame as illustrated in FIG. 11. For example, when the fault determination criteria of the ring network do not include the RDI state as described above, the ring control unit instructs to stop the transmission of the CCM frame.

In response to the instruction from the ring control unit, the second monitoring point MEPd2 transmits the RDI frame or stops the transmission of the CCM frame. As a result, the first monitoring point MEPc1 of the switching device SWc recognizes the RDI state by receiving the RDI frame or recognizes the LOC state without receiving the CCM frame within a predetermined period. As a result, the switching device SWc (ring control unit therein (not shown)) detects the fault (SF) via the first monitoring point MEPc1 to control the first port Pr[1] to the block state BK and transmit the R-APS (SF) frame from the second port Pr[2] (and first port Pr[1]).

<<Operation of Relay System at the Time of Fault Presence (Modification Example)>>

Figure 12:
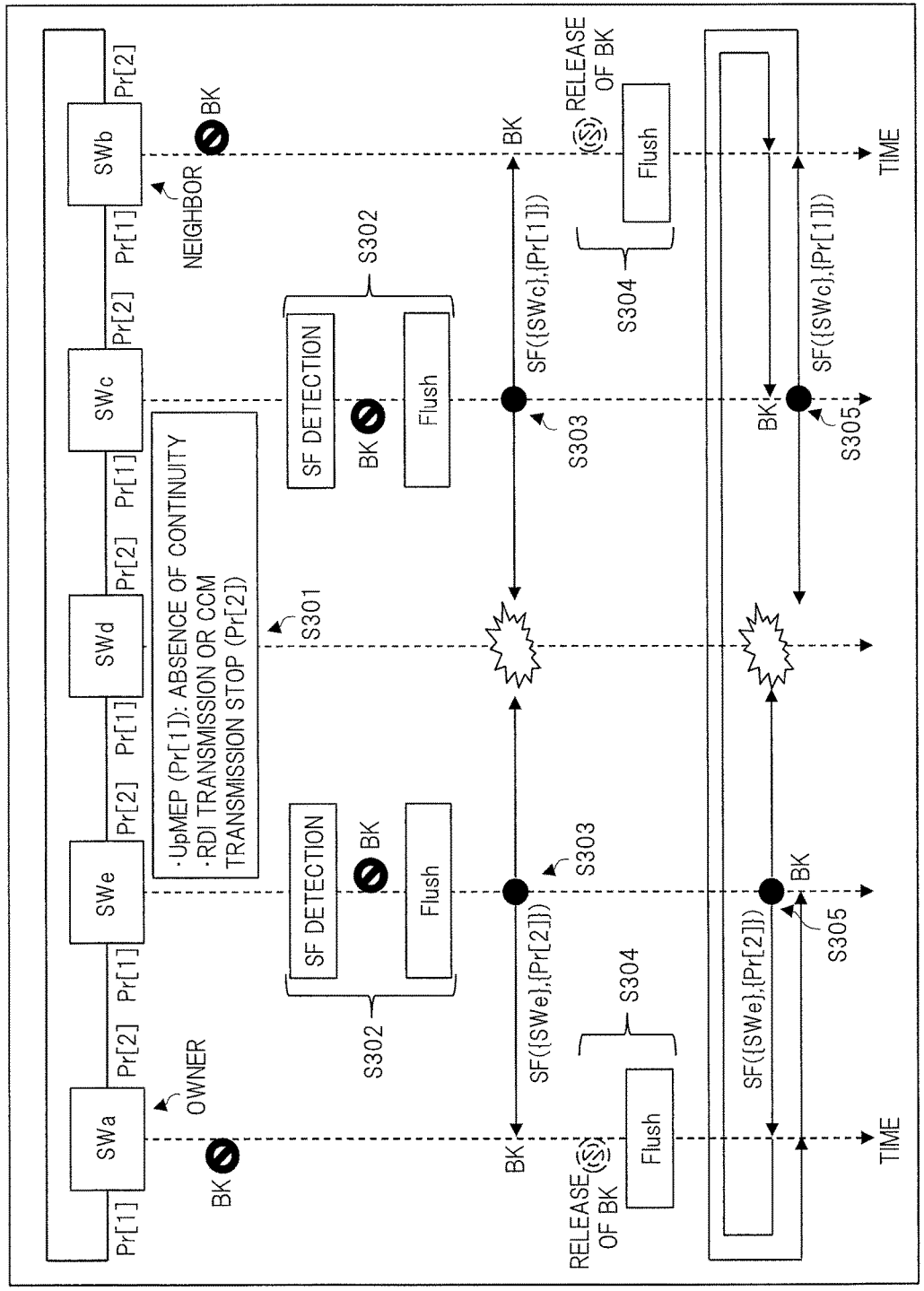
FIG. 12 is a diagram schematically illustrating an example of an operation sequence in the case where a fault inside the device illustrated in FIG. 11 occurs in the relay system of FIG. 2 and FIG. 11.

FIG. 12 is a diagram schematically illustrating an example of an operation sequence in the case where a fault inside the device illustrated in FIG. 11 occurs in the relay system of FIG. 2 and FIG. 11. In FIG. 12, first, the ring port Pr[1] of the switching device SWa serving as an owner node and the ring port Pr[2] of the switching device SWb serving as a neighbor node are both controlled to the block state BK. In this state, as illustrated in FIG. 11, the switching device SWd instructs the second monitoring point MEPd2 to transmit the RDI frame or instructs it to stop the transmission of the CCM frame when the monitoring result at the first monitoring point MEPd1 is the absence of continuity (Step S301).

By Step S301, the switching device SWc simulatively detects the internal fault of the switching device SWd as a fault (SF) of a link connected to the ring port Pr[1]. In response to this, the switching device SWc controls the ring port Pr[1] to the block state BK, and flushes (deletes) the address table FDB (Step S302). In the same way, the switching device SWe also simulatively detects the internal fault of the switching device SWd as a fault (SF) of a link connected to the ring port Pr[2]. In response to this, the switching device SWe controls the ring port Pr[2] to the block state BK, and flushes (deletes) the address table (FDB) (Step S302).

Subsequently, the switching device SWc which has detected the fault (SF) transmits the R-APS (SF) frame containing information of the ring port controlled to the block state BK ({SWc}/{Pr[1]}) to the ring network 10 (Step S303). Similarly, the switching device SWe also transmits the R-APS (SF) frame containing information of the ring port controlled to the block state BK ({SWe} and {Pr[2]}) to the ring network 10 (Step S303).

The R-APS (SF) frames transmitted by the switching devices SWc and SWe are relayed by each switching device until reaching a ring port in the block state BK. Here, when the switching device SWa serving as an owner node has received the R-APS (SF) frame, the switching device SWa releases the block state BK of the ring port Pr[1] (that is, changes the state into an open state), and flushes (deletes) the address table FDB (Step S304).

In the same way, when the switching device SWb serving as a neighbor node has received the R-APS (SF) frame, the switching device SWb also releases the block state BK of the ring port Pr[2] (that is, changes the state into an open state), and flushes (deletes) the address table FDB (Step S304).

After that, the R-APS (SF) frame is transmitted at regular intervals by the switching devices SWc and SWe, and a steady state is reached (Step S305).

Figure 13:
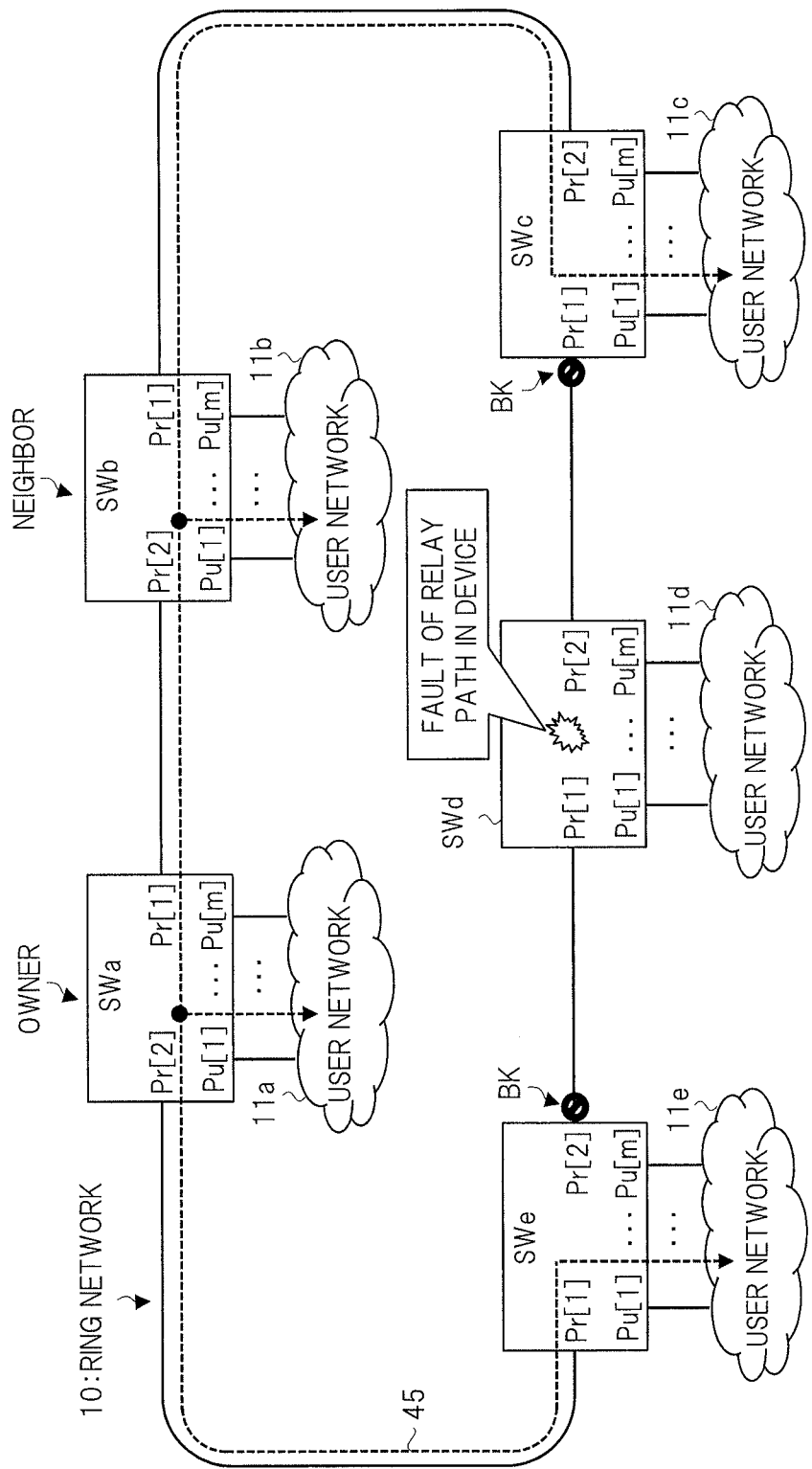
FIG. 13 is a diagram illustrating a frame transfer path after path switching of the ring network is performed by the operation of FIG. 12.

FIG. 13 is a diagram illustrating a frame transfer path after path switching of the ring network is performed by the operation of FIG. 12. When the operation of FIG. 12 has been executed and the steady state (Step S305) has been reached, a communication path 45 via the switching devices SWa and SWb is formed between the switching device SWe and the switching device SWc as illustrated in FIG. 13. The frame transfer between the user networks 11e, 11a, 11b and 11c is performed on this communication path 45. As a result, for example, a frame directed to the user network 11c from the user network 11e reaches the user network 11c without being lost via the communication path 45 unlike the case of FIG. 16.

<<Operation of Relay Device at the Time of Internal Fault (Modification Example)>>

Figure 14:
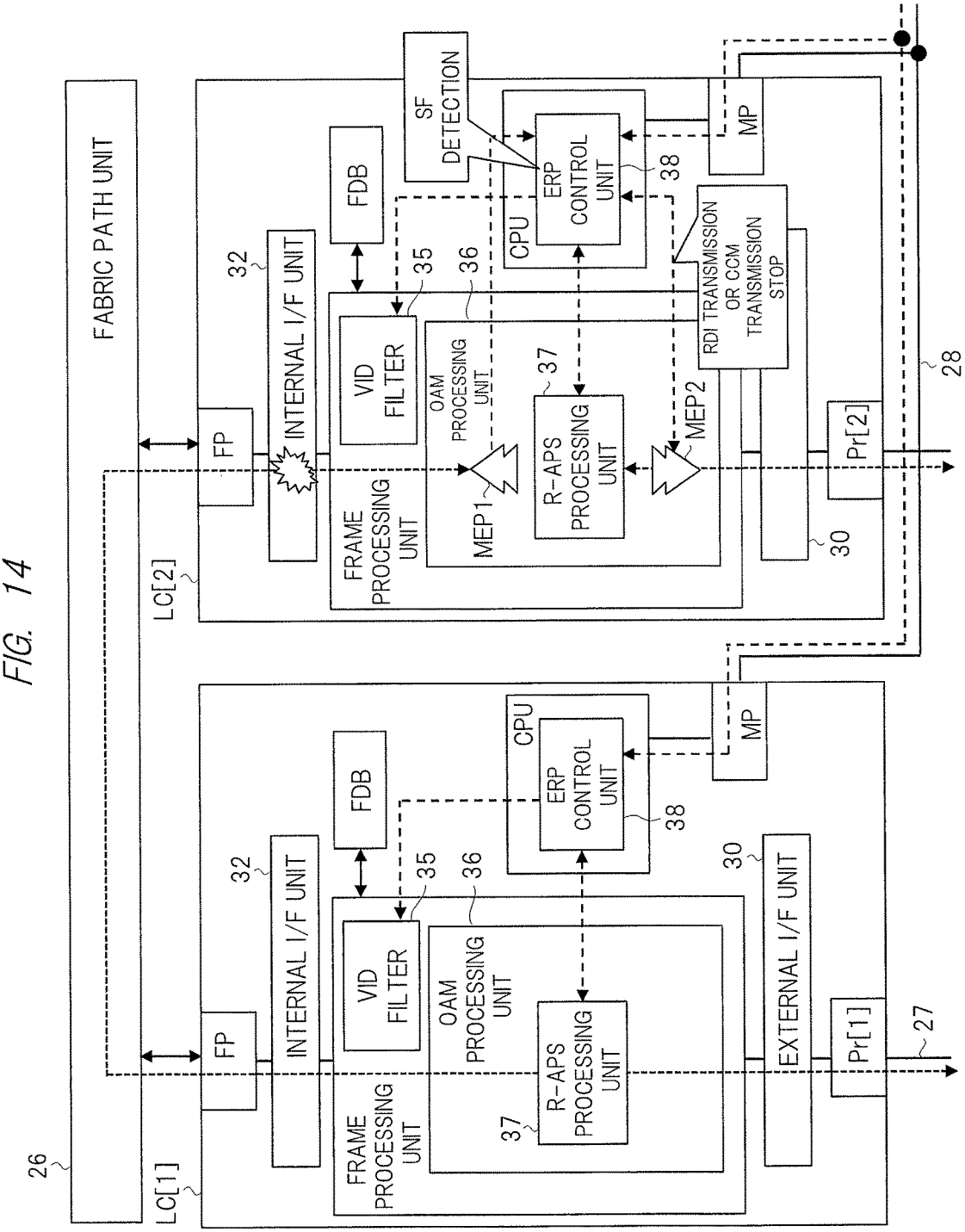
FIG. 14 is an explanatory diagram schematically illustrating an operation example, which is different from that of FIG. 10, around the OAM processing unit and the ERP control unit provided in the relay device of the relay system of FIG. 11.

FIG. 14 is an explanatory diagram schematically illustrating an operation example, which is different from that of FIG. 10, around the OAM processing unit and the ERP control unit provided in the relay device of the relay system of FIG. 11. For example, the switching device (relay device) SWd in FIG. 11 is a chassis type switching device illustrated in FIG. 7 and FIG. 8 and performs the operation illustrated in FIG. 14 in response to the internal fault of the device.

In FIG. 14, like the case of FIG. 10, the first monitoring point MEP1 in the line card LC[2] notifies the ERP control unit (ring control unit) 38 of the monitoring result of the absence of continuity, and in response to this, the ERP control unit 38 detects a fault (SF). At this time, unlike the case of FIG. 10, the ERP control unit 38 instructs the second monitoring point MEP2 to transmit the RDI frame or stop the transmission of the CCM frame. In response to this instruction, the second monitoring point MEP2 transmits the RDI frame from the second port Pr[2] or stops the transmission of the CCM frame from the second port Pr[2].

As described above, the following effects can be obtained by using the relay system and the relay device of the second embodiment in addition to the effects similar to those of the first embodiment.

For example, the case where the monitoring result of the first monitoring point MEP1 is the absence of continuity in accordance with the fault of the internal interface unit 32 of the line card LC[2] as illustrated in FIG. 14 is assumed. In this case, for example, it may become difficult to relay the frame between the ring port (second port) Pr[2] provided in the line card LC[2] and user ports Pu[1] to Pu[m] provided in a different line card. Consequently, in the communication path 25 illustrated in FIG. 5, for example, the frame directed to the user network 11d from the user network 11c may be lost. Thus, it is sometimes advantageous to form the communication path 45 illustrated in FIG. 13 by using the method of the second embodiment.

The operation example at the time of fault (SF) has been described here. Alternatively, at the time of recovery from fault in FIG. 11, the second monitoring point MEPd2 may start the transmission of the CCM frame (or CC frame when CCM monitoring section 21bc has no fault). More specifically, in the line card LC[2] of FIG. 10, when the monitoring result at the first monitoring point MEP1 is changed from absence of continuity to presence of continuity, the ERP control unit 38 detects the recovery from fault and instructs the second monitoring point MEP2 to start the transmission of the CCM frame (CC frame).

In the foregoing, the invention made by the inventor of the present invention has been concretely described based on the embodiments. However, the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, although the case where a neighbor node is set in a ring network is taken as an example in the description above, the method of the present embodiment can be similarly applied also to the case where a neighbor node is not set and only an owner node is set. In addition, the ERP control unit 38 does not necessarily need to be configured by the processor unit CPU, and may be configured by dedicated hardware depending on the case. Furthermore, the management card MC may be configured to include the ERP control unit 38.

What is claimed is:

1. A relay system including a plurality of relay devices constituting a ring network, each of the plurality of relay devices comprising:

a first port and a second port which are connected to the ring network;

a relay path for relaying a frame between the first port and the second port;

a first monitoring point and a second monitoring point provided on a side close to the second port on the relay path; and a ring control unit which controls the ring network, wherein the first monitoring point monitors continuity between itself and the second monitoring point of a first different device via the relay path of its own device by using a CCM frame based on Ethernet OAM, and wherein the second monitoring point monitors continuity between itself and the first monitoring point of a second different device via the relay path of the second different device by using the CCM frame wherein at least one of the plurality of relay devices includes:

a plurality of line cards for transmitting and receiving a frame to and from outside of the device; and a fabric path unit which relays a frame between the plurality of line cards, the first port is provided in a first line card, and the second port, the first monitoring point and the second monitoring point are provided in a second line card, wherein the first monitoring point generates a first CCM frame addressed to the second monitoring point of the first different device and transmits the first CCM frame to the fabric path unit, and the first CCM frame is transmitted from the fabric path unit to the first ort of the first line card and is transmitted from the first s ort to the first different device, wherein a second CCM frame transmitted by the first different device is received by the first port of the first line card, and the second CCM frame is transmitted from the first port through the fabric path unit to the first monitoring point, wherein the second monitoring point generates a third CCM frame addressed to the first monitoring point of the second different device and transmits the third CCM frame to the second port, and the third CCM frame is transmitted from the second port to the second different device, and wherein a fourth CCM frame transmitted by the second different device is received by the second port, and the fourth CCM frame is transmitted from the second port to the second monitoring point.

2. The relay system according to claim 1,
wherein, when a monitoring result at the first monitoring point is absence of continuity, the ring control unit controls the first port to a block state in which frame transmission is prohibited, and transmits a fault notification frame from the second port.

3. The relay system according to claim 1,
wherein the first line card further includes a first R-APS processing unit which transmits and receives a R-APS frame based on ITU-T G.8032 at the first port, and the second line card further includes a second R-APS processing unit which transmits and receives the R-APS frame at the second port.

4. The relay system according to claim 1,
wherein, when a monitoring result at the first monitoring point is absence of continuity, the ring control unit instructs the second monitoring point to transmit a RDI frame based on Ethernet OAM or instructs the second monitoring point to stop transmission of the CCM frame.

5. The relay system according to claim 1,
wherein the ring control unit controls the ring network based on a ring protocol specified by ITU-T G.8032.

6. A relay device constituting a ring network, comprising:
a first port and a second port which are connected to the ring network;
a relay path for relaying a frame between the first port and the second port;
a first monitoring point and a second monitoring point provided on a side close to the second port on the relay path;
a ring control unit which controls the ring network;
a plurality of line cards for transmitting and receiving a frame to and from outside of the device; and
a fabric path unit which relays a frame between the plurality of line cards,
wherein the first monitoring point monitors continuity between itself and the second monitoring point of a first different device via the relay path of its own device by using a CCM frame based on Ethernet OAM, and
the second monitoring point monitors continuity between itself and the first monitoring point of a second different device via the relay path of the second different device by using the CCM frame, and wherein the first port is provided in a first line card, and the second port, the first monitoring point and the second monitoring point are provided in a second line card, wherein the first monitoring point generates a first CCM frame addressed to the second monitoring point of the first different device and transmits the first CCM frame to the fabric path unit, and the first CCM frame is transmitted from the fabric path unit to the first port of the first line card and is transmitted from the first port to the first different device, wherein a second CCM frame transmitted by the first different device is received by the first port of the first line card, and the second CCM frame is transmitted from the first port through the fabric path unit to the first monitoring point, wherein the second monitoring point generates a third CCM frame addressed to the first monitoring point of the second different device and transmits the third CCM frame to the second port, and the third CCM frame is transmitted from the second port to the second different device, and wherein a fourth CCM frame transmitted by the second different device is received by the second port, and the fourth CCM frame is transmitted from the second port to the second monitoring point.

7. The relay device according to claim 6,
wherein, when a monitoring result at the first monitoring point is absence of continuity, the ring control unit controls the first port to a block state in which frame transmission is prohibited, and transmits a fault notification frame from the second port.

8. The relay device according to claim 7,
wherein the first line card further includes a first R-APS processing unit which transmits and receives a R-APS frame based on ITU-T G.8032 at the first port, and
the second line card further includes a second R-APS processing unit which transmits and receives the R-APS frame at the second port.

9. The relay device according to claim 7,
wherein, when a monitoring result at the first monitoring point is absence of continuity, the ring control unit instructs the second monitoring point to transmit a RDI frame based on Ethernet OAM or instructs the second monitoring point to stop transmission of the CCM frame.

10. The relay device according to claim 7,
wherein the ring control unit controls the ring network based on a ring protocol specified by ITU-T G.8032.

* * * * *